United States Patent
Koike et al.

(10) Patent No.: US 8,861,742 B2
(45) Date of Patent: Oct. 14, 2014

(54) MASKER SOUND GENERATION APPARATUS AND PROGRAM

(75) Inventors: Mai Koike, Anjo (JP); Yasushi Shimizu, Hamamatsu (JP); Masato Hata, Hamamatsu (JP); Takashi Yamakawa, Iwata (JP)

(73) Assignee: Yamaha Corporation, Hamamatsu-shi (JP)

( * ) Notice: Subject to any disclaimer, the term of this patent is extended or adjusted under 35 U.S.C. 154(b) by 500 days.

(21) Appl. No.: 13/013,634

(22) Filed: Jan. 25, 2011

(65) Prior Publication Data

US 2011/0182438 A1    Jul. 28, 2011

(30) Foreign Application Priority Data

Jan. 26, 2010  (JP) ................................ 2010-014873
Jan. 26, 2010  (JP) ................................ 2010-014875
Jan. 26, 2010  (JP) ................................ 2010-014876

(51) Int. Cl.
   *H04R 3/02*   (2006.01)
   *G01L 21/04*  (2006.01)
(52) U.S. Cl.
   CPC ..................................... *G01L 21/04* (2013.01)
   USPC ...................................................... 381/73.1
(58) Field of Classification Search
   CPC ................................................... G10K 11/175
   USPC ................ 700/94; 704/225, 226; 381/66, 61, 381/71.13, 71.14, 74, 94.1, 94.2, 94.3, 94.4, 381/104, 106, 56, 375, 60, 71.1, 73.1, 86, 381/312, 314, 330, 370, 374, 381, 384, 424
   See application file for complete search history.

(56) References Cited

U.S. PATENT DOCUMENTS

| 7,143,028 | B2 | 11/2006 | Hillis et al. |
| 7,184,952 | B2 | 2/2007 | Hillis et al. |
| 7,363,227 | B2* | 4/2008 | Mapes-Riordan et al. ... 704/273 |
| 7,505,898 | B2 | 3/2009 | Hillis et al. |
| 2006/0241939 | A1* | 10/2006 | Hillis et al. .................. 704/213 |
| 2008/0235008 | A1* | 9/2008 | Ito et al. ....................... 704/216 |
| 2008/0243492 | A1* | 10/2008 | Miki et al. .................... 704/205 |
| 2009/0161883 | A1* | 6/2009 | Katsianos ....................... 381/57 |

FOREIGN PATENT DOCUMENTS

| JP | 2008-090296 A | 4/2008 |
| JP | 2008-233670 A | 10/2008 |
| JP | 2008-233671 A | 10/2008 |
| JP | 2008-233672 A | 10/2008 |

* cited by examiner

*Primary Examiner* — Vivian Chin
*Assistant Examiner* — William A Jerez Lora
(74) *Attorney, Agent, or Firm* — Morrison & Foerster LLP

(57) ABSTRACT

In a masker sound generation apparatus, an acquisition part acquires a sound signal, and a generation part generates a masker sound signal based on the acquired sound signal. Specifically, the generation part divides the sound signal acquired by the acquisition part into a plurality of sections each having a predetermined time length, then repeats a sorting process of sorting the divided sections as a process of changing the sequence of arrangement of the sound signal, and alters a manner of sorting the sections each time the sorting process is repeated.

18 Claims, 16 Drawing Sheets

| VOICE | ATTRIBUTE |
|---|---|
| SOUND SIGNAL S | MALE, HIGH PITCH VOICE |
| SOUND SIGNAL S | MALE, MIDDLE PITCH VOICE |
| ...... | ...... |
| ...... | ...... |
| ...... | ...... |
| ...... | ...... |
| ...... | ...... |

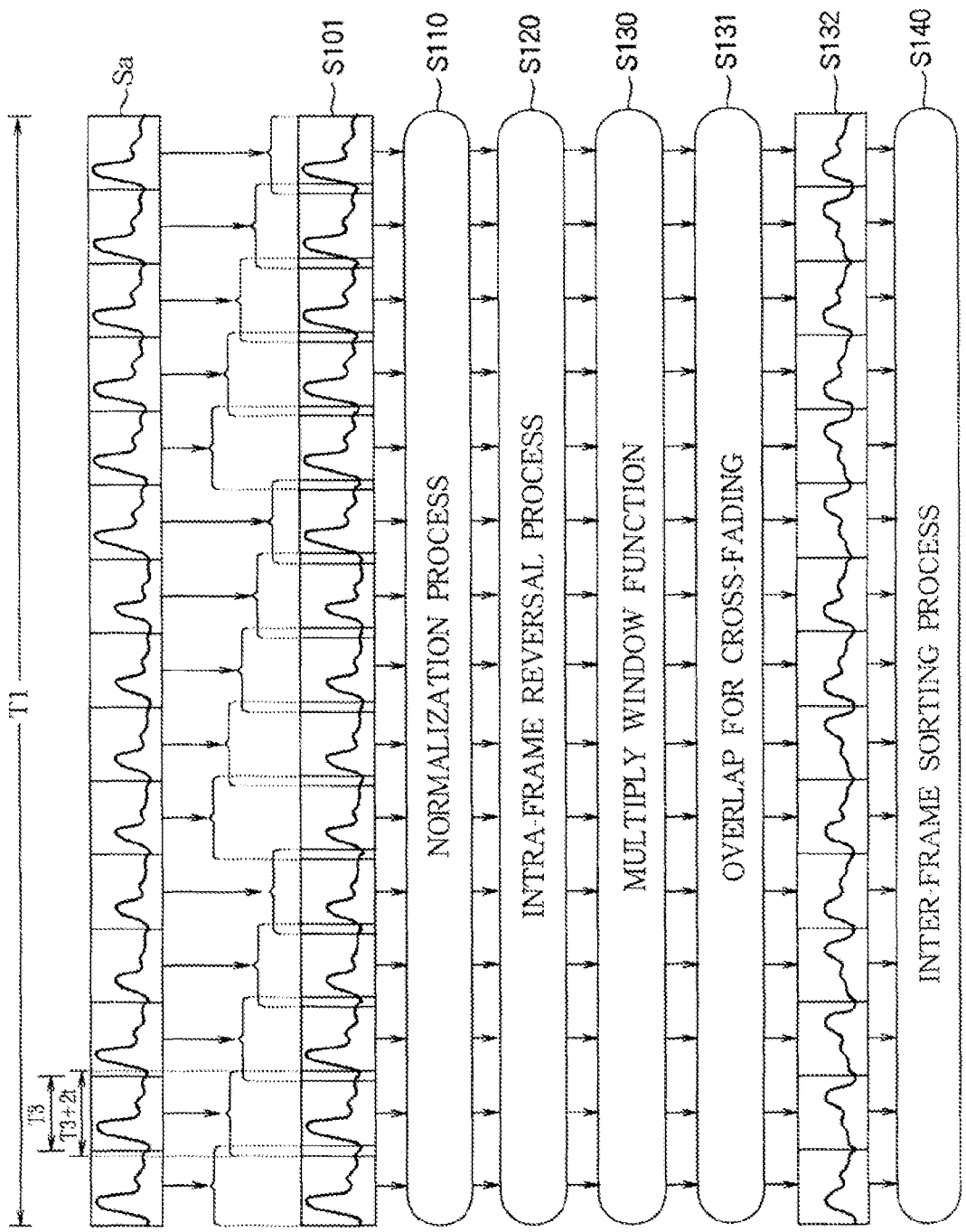

MASKER SOUND GENERATION APPARATUS AND PROGRAM

BACKGROUND OF THE INVENTION

1. Technical Field of the Invention

The present invention relates to a technology for generating a masker sound signal to prevent sound from being overheard.

2. Description of the Related Art

Various technologies for preventing sound from being overheard using a masking effect have been proposed. The masking effect is a phenomenon in which, when two kinds of sound signals are transmitted to the same space, it is difficult for a person present in the space to perceive the respective sound signals according to a relationship between acoustic properties (a frequency component, a time waveform, etc.) of the sound signals. In most of such technologies, a masker sound is emitted to disturb hearing the voice of a speaker in a region adjacent to another region in which the speaker is present via a wall or a partition. In this case, the masker sound may be a noise having a spectrum over a wide band. However, it is known that a sound exhibiting properties similar to those of a sound as an object to disturb hearing (hereinafter, referred to as a target sound) achieves a high masking effect.

Patent Reference 1 discloses a masking system configured to select a masker sound exhibiting the highest masking effect from a plurality of kinds of masker sounds every time and to discharge the selected masker sound. The masking system disclosed in this patent reference prevents voices from being overheard between two regions, e.g., two acoustic spaces 20A and 20B, adjacent to each other while a wall is disposed between the two regions. In this masking system, voices of people having different ages, languages, and genders are previously collected. A scramble sound signal obtained by sorting a frame arrangement of a sound signal of each of the collected voices is stored in a memory together with acoustic property information indicating a format or a power spectrum of each of the voices corresponding to the scramble sound signal. In this masking system, the voice of a speaker present in the acoustic space 20A is analyzed to obtain acoustic property information thereof, a scramble sound signal, stored in the memory, corresponding to acoustic property information the most approximate to the obtained acoustic property information is read, and this scramble sound signal is discharged into the acoustic space 20B as a masker sound. According to this technology, a masker sound exhibiting properties the most approximate to the voice of a speaker present in the acoustic space 20A is discharged into the acoustic space 20B, with the result that it is possible to achieve a high masking effect in the acoustic space 20B.

Patent Reference 2 discloses a technology for processing a sound waveform of the voice of a person to prevent the voice of the person from being heard. A masking system disclosed in this patent reference divides a sound signal of the voice recorded through a microphone installed in a room into a plurality of sections each having a time length corresponding to each syllable, generates a masker sound signal by reversing samples in each section and sorting the arrangement of the sections, and discharges the generated masker sound signal into a neighboring room. The sound quality of the masker sound generated by this method is similar to that of the voice of a speaker; however, it is difficult for a person present in the neighboring room to understand contents of the original voice from the masker sound. Consequently, it is possible to discharge this masker sound into the region into which a target sound leaks, thereby achieving a high masking effect in the region.

[Patent Reference 1] Japanese Patent Application Publication No. 2008-233672

[Patent Reference 2] Japanese Patent Application Publication No. 2008-233671

In the masking system disclosed in Patent Reference 1, it is necessary to continuously and repeatedly discharge one scramble sound selected from a plurality of kinds of scramble sound signals into the acoustic space 20B as a masker sound so as to secure a masking effect in the acoustic space 20B. However, if the same masker signal is continuously and repeatedly discharge for a long period of time as described above, a person present in the acoustic space 20B may perceive that the same masker signal is repeatedly discharged, with the result that the person may feel a sense of incongruity.

In the masking system disclosed in Patent Reference 2, a sound waveform obtained by reversing a sample array of a sound waveform of the voice of a person exhibits an unnatural accent different from that of the original sound waveform. For this reason, if the sound waveform obtained by reversing the sample array of the sound waveform of the voice of the person is continuously discharged as a masker sound, a person present in a region into which the masker sound is discharged may feel a sense of incongruity.

SUMMARY OF THE INVENTION

The present invention has been made in view of the above problem, and it is an object of the present invention to prevent periodicity of a discharged masker sound from being easily perceived, thereby preventing a person who is present in a region into which the masker sound is discharged from feeling a sense of incongruity and thus achieving a high masking effect in such a region.

In accordance with a first aspect of the present invention, a masker sound generation apparatus comprises: an acquisition part that acquires a sound signal; and a generation part that repeats a process of outputting a masker sound signal obtained by changing a sequence of arrangement of the sound signal acquired by the acquisition part, and that repeats a process of altering a manner of changing the sequence of arrangement of the sound signal.

According to this masker sound generation apparatus, an auditory sense of the masker sound signal is changed each time the generation part alters a manner of changing the arrangement sequence of the sound signal. Consequently, it is possible for a person present in a region into which the sound is discharged to feel less of a sense of incongruity than in a case where the same masker sound signal is continuously and recurrently discharged.

Preferably, the generation part divides the sound signal acquired by the acquisition part into a plurality of sections each having a predetermined time length, then repeats a sorting process of sorting the divided sections as a process of changing the sequence of arrangement of the sound signal, and alters a manner of sorting the sections as the process of altering the manner each time the sorting process is repeated.

According to this masker sound generation apparatus, the arrangement sequence is changed section by section having a predetermined time length. Consequently, it is possible to generate a masker sound signal exhibiting a higher masking effect than in a case where the arrangement sequence of the sound signal is changed sample by sample.

Preferably, the acquisition part acquires a plurality of kinds of sound signals so as to generate one kind of masker sound signal, and the generation part divides each of the plurality of kinds of the sound signals into a plurality of sections each having a predetermined time length, then repeats a sorting process of sorting the divided sections as a process of changing the sequence of arrangement of the sound signal, and alters a manner of sorting the sections of each of the plurality of kinds of the sound signals as the process of altering the manner.

According to this masker sound generation apparatus, a plurality of kinds of sound signals are mixed to obtain a composite masker sound signal. Consequently, it is possible to achieve a high masking effect even in a case where a plurality of sounds are provided as objects to be masked.

Preferably, the generation part performs a reversal process of reversing arrangement of the sound signal within each section obtained by dividing the sound signal, and generates the masker sound signal using signals obtained through the reversal process and the sorting process.

Also, the generation part may apply a sound effect to at least some of the plurality of kinds of sound signals after sorting the sections and take the signals to which the sound effect has been applied as objects to be mixed.

Also, a masker sound generation apparatus according to another preferred embodiment of the present invention includes: an acquisition part that acquires a sound signal; and a generation part that repeats a process of changing the arrangement sequence of the sound signal acquired by the acquisition part, then applies a sound effect to the signal the arrangement sequence of which has been changed, and outputs the signal to which the sound effect has been applied as a masker sound signal and repeats a process of changing a manner of applying the sound effect.

According to this masker sound generation apparatus, an auditory sense of the masker sound signal is changed each time the generation part changes the manner of applying the sound effect. Consequently, it is possible for a person present in a region into which the sound is discharged to feel less of a sense of incongruity than in a case where the same masker sound signal is continuously and recurrently discharged.

Also, a masker sound generation apparatus according to another preferred embodiment of the present invention includes: an acquisition part that acquires a plurality of kinds of sound signals; and a generation part that repeats a process of changing the arrangement sequence of the plurality of kinds of sound signals acquired by the acquisition part, applies a sound effect to signals obtained by changing the arrangement sequence of at least some of the plurality of kinds of sound signals, the arrangement sequence of which has been changed, then mixes the signals to which the sound effect has been applied, and outputs the mixed signals as a masker sound signal while repeating a process of changing a mixing manner of the signals.

According to this masker sound generation apparatus, an auditory sense of the masker sound signal is changed each time the generation part changes the mixing manner. Consequently, it is possible for a person present in a region into which the sound is discharged to feel less of a sense of incongruity than in a case where the same masker sound signal is continuously discharged.

Also, a masker sound generation apparatus according to another preferred embodiment of the present invention includes a generation part that repeats a process of changing the arrangement sequence of a plurality of kinds of sound signals acquired by the acquisition part, then applies a sound effect to signals obtained by changing the arrangement sequence of at least some of the plurality of kinds of sound signals, the arrangement sequence of which has been changed, then takes a signal obtained by mixing the signals to which the sound effect has been applied as an object to be repeatedly processed, and outputs a sound signal obtained by changing the arrangement sequence of the signal taken as the object to be repeatedly processed as a masker sound signal and repeats a process of changing the arrangement sequence.

According to this masker sound generation apparatus, an auditory sense of the masker sound signal is changed each time the generation part alters a manner of changing the arrangement sequence. Consequently, it is possible for a person present in a region into which the sound is discharged to feel less of a sense of incongruity than in a case where the same masker sound signal is continuously discharged.

Also, a program according to a preferred embodiment of the present invention is executable by a computer to perform: acquiring a sound signal; repeating a process of outputting a masker sound signal obtained by changing a sequence of arrangement in the acquired sound signal; and repeating a process of altering a manner of changing the sequence of arrangement of the sound signal.

In accordance with a second aspect of the present invention, a masker sound generation apparatus comprises: an acquisition part that acquires a sound signal; and a generation part that divides the sound signal acquired by the acquisition part into a plurality of sections each having a predetermined time length and containing a sound signal fractions, then generates sound signal fractions obtained by selecting some of the divided sections and by reversing each of the sound signal fractions of the selected sections, and sequentially outputs the generated sound signal fractions to form a masker sound signal.

It is much more difficult to hear an unnatural accent from the masker sound signal obtained according to this invention than from a sound signal obtained by reversing all sound signals in a plurality of sections. Consequently, it is possible to discharge the masker sound signal generated according to this invention into the same region as a target sound, thereby preventing a person who is present in the region from feeling a sense of incongruity and thus achieving a high masking effect.

Preferably, the generation part generates sound signal fractions obtained by reversing arrangement of each of the sound signal fractions of the selected sections, and sorts the plurality of sections of the sound signal and sequentially outputs the sorted sections of the sound signal to form the masker sound signal.

Preferably, the generation part repeatedly alters a manner of sorting the plurality of sections of the sound signal.

Preferably, the generation part repeats change of sections in which the arrangements of the sound signal fractions are reversed among the plurality of sections.

Also, the present invention provides a program executable by a computer to perform: acquiring a sound signal; dividing the acquired sound signal into a plurality of sections each having a predetermined time length and containing a sound signal fractions; generating sound signal fractions obtained by selectively reversing the sound signal fractions in some of the divided sections; and sequentially outputting the generated sound signal fractions to form a masker sound signal.

In accordance with a third aspect of the present invention, a masker sound generation apparatus comprises: an acquisition part that acquires a sound signal; and a generation part that generates a masker sound signal obtained by changing a sequence of arrangement of the sound signal acquired by the acquisition part, wherein the generation part performs a normalization process of limiting fluctuation in time domain of a sound volume of the masker sound signal within a predetermined range during the course of generating the masker sound signal.

It is much more difficult to hear an unnatural accent from the masker sound signal obtained according to this invention than from a masker sound signal obtained without performing a normalization process. Consequently, it is possible to discharge the masker sound signal generated according to this invention into the same region as a target sound, thereby preventing a person who is present in the region from feeling a sense of incongruity and thus achieving a high masking effect.

Preferably, the generation part divides the sound signal acquired by the acquisition part into a plurality of sections each having a predetermined time length, and performs a process of limiting an average sound volume of each of the sections within a predetermined range as the normalization process.

Preferably, during the normalization process, the generation part determines a representative value of the average sound volume among the plurality of sections, then obtains a correction coefficient to equalize the average sound volume of each section with the representative value, and corrects the sound signal of each section using the correction coefficient obtained per section.

Alternatively, during the normalization process, the generation part determines a representative value of the average sound volume among the plurality of sections, then obtains a correction coefficient to limit a difference between the average sound volume of each section and the representative value within a predetermined range, and corrects the sound signal of each section using the correction coefficient obtained per section.

Also, the present invention provides a program executable by a computer to perform: acquiring a sound signal; generating a masker sound signal obtained by changing a sequence of arrangement in the acquired sound signal; and carrying out a normalization process of limiting fluctuation in time domain of a sound volume of the masker sound signal within a predetermined range during the course of generating the masker sound signal.

BRIEF DESCRIPTION OF THE DRAWINGS

FIG. 18 is a view illustrating a sound signal process performed by a masker sound generation apparatus according to yet another embodiment of the present invention.

DETAILED DESCRIPTION OF THE INVENTION

Hereinafter, embodiments of the present invention will be described with reference to the accompanying drawings.

First Embodiment

Figure 1:
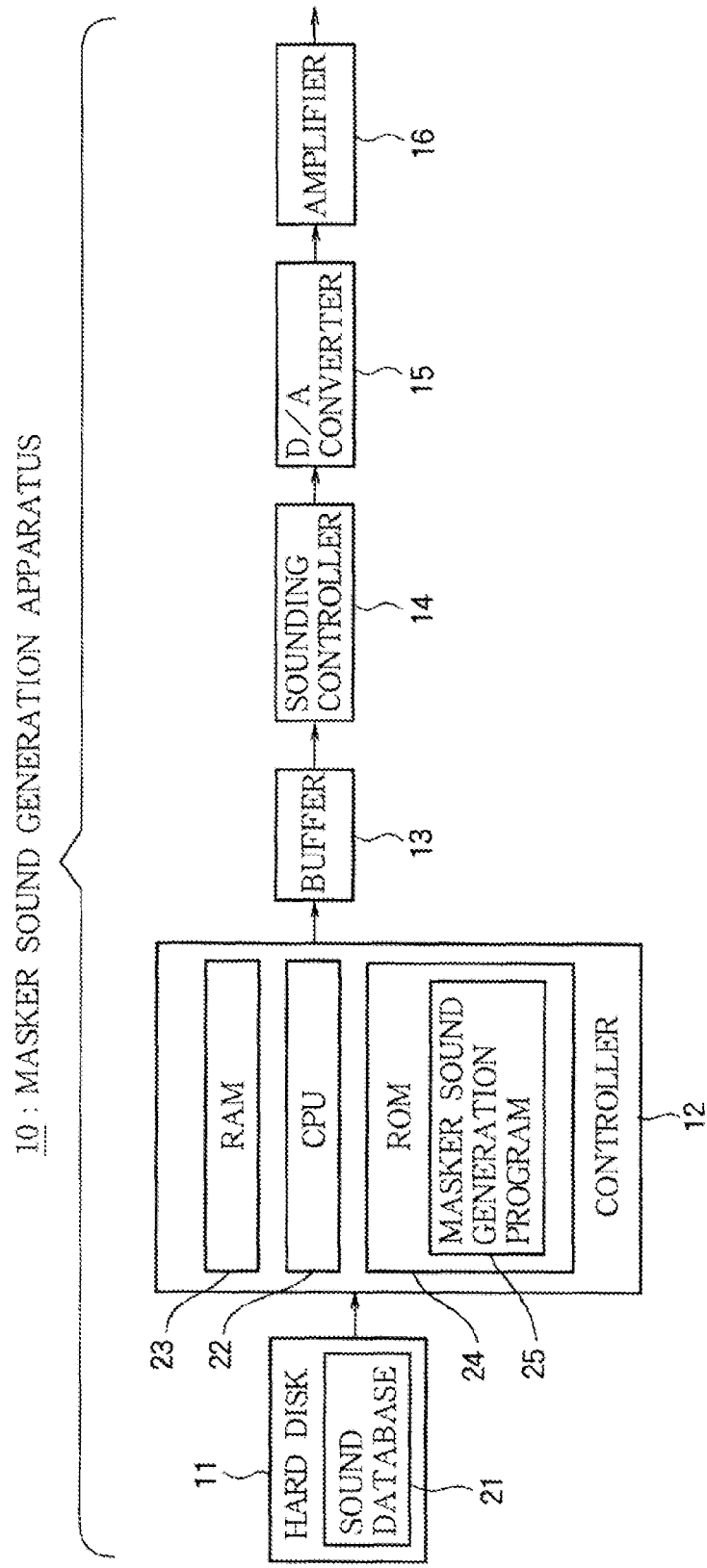
FIG. 1 is a block diagram illustrating the construction of a masker sound generation apparatus according to first to eighth embodiments of the present invention.
Figures 2, 3:
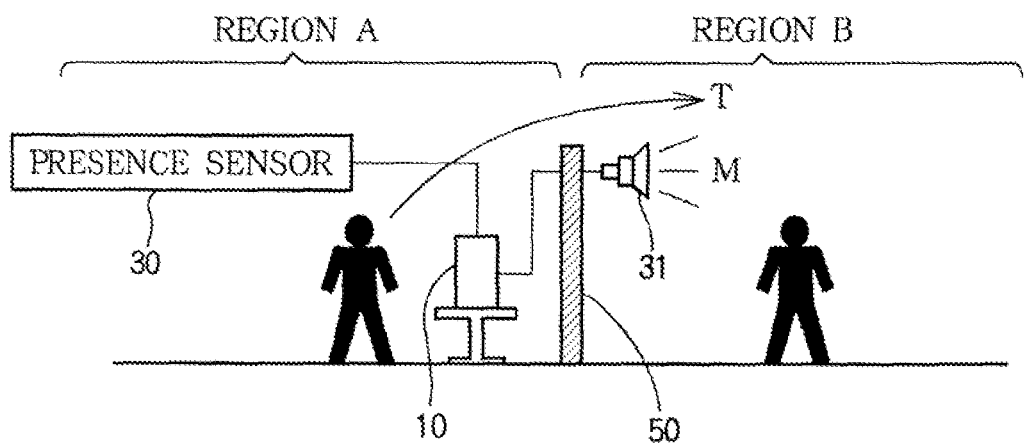
FIG. 2 is a view illustrating an installation example of the masker sound generation apparatus of FIG. 1.
FIG. 3 is a data structure diagram of a sound database stored in the masker sound generation apparatus of FIG. 1.

FIG. 1 is a block diagram illustrating the construction of a masker sound generation apparatus 10 according to a first embodiment of the present invention. FIG. 2 is a view illustrating an installation example of the masker sound generation apparatus 10. As shown in FIG. 2, the masker sound generation apparatus 10 is installed in a region A separated from the outside by a partition 50. A presence sensor 30 for sensing the entry of a speaker into the region A and the exit of the speaker from the region A is mounted in the region A. The masker sound generation apparatus 10 outputs a masker sound signal M for disturbing hearing of a speech sound, as a target sound T, transmitted from the region A to a region B outside the region A over the partition 50 through a speaker unit 31 in the region B until the presence sensor 30 senses the exit of the speaker from the region A after the presence sensor 30 senses the entry of the speaker into the region A.

Referring to FIG. 1, the masker sound generation apparatus 10 includes a hard disk 11, a controller 12, a buffer 13, a sounding controller 14, a D/A converter 15, and an amplifier 16. The hard disk 11 stores a sound database 21. The sound database 21 is a set of records corresponding to voices per time length T1 (for example, T1=30 seconds) recorded from people exhibiting various voice properties. As shown in FIG. 3, a record corresponding to one of the voices in the sound database 21 has a field of 'voice' indicating a sound signal S per time length T1 of the corresponding voice and a field of 'attribute' indicating attribute information of the corresponding voice. The sound signal S is a sequence of digital sample data of sound. The attribute information has, for example, combinations of gender of people whose voices have been recorded and voice pitch (a high pitch voice, a middle pitch voice, and a low pitch voice) of the people. The attribute information has 6 combinations, such as 'a male and a high pitch voice,' 'a male and a middle pitch voice,' 'a male and a low pitch voice,' 'a female and a high pitch voice,' 'a female and a middle pitch voice,' and 'a female and a low pitch voice.'

The controller 12 has a CPU 22, a RAM 23, and a ROM 24. The CPU 22 executes a masker sound generation program 25 stored in the ROM 24 while using the RAM 23 as a work area. The masker sound generation program 25 is a program that enables the CPU 22 to perform two processes, i.e., an acquisition process and a generation process. The acquisition process is a process of acquiring a plurality of kinds of sound signals S from the sound database 21 and loading the acquired sound signals in the RAM 23. The generation process is a process of repeatedly outputting a signal obtained by changing the arrangement sequence of the sound signals S loaded in the RAM 23, as a masker sound signal M, to the buffer 13 and, in addition, for repeatedly altering a manner of changing the arrangement sequence. The acquisition process and the generation process will be described in detail later. The sounding controller 14 is a circuit for repeatedly performing a process of reading the latest masker sound signal M written in the buffer 13 and outputting the read masker sound signal to the D/A converter 15. The D/A converter 15 converts the masker sound signal M output through the sounding controller 14 into an analog signal and outputs the analog signal to the amplifier 16. The amplifier 16 amplifies the analog signal output from the D/A converter 15 and outputs the amplified analog signal from the speaker unit 31 as a sound.

Next, the operation of this embodiment will be described. Upon receipt of a detection signal $S_{IN}$ indicating that a speaker has entered the region A from the presence sensor 30, the CPU 22 of the masker sound generation apparatus 10 performs the acquisition process and the generation process. In the acquisition process, the CPU 22 selects a sound signal S corresponding to the attribute information of 'a male and a high pitch voice,' a sound signal S corresponding to the attribute information of 'a male and a middle pitch voice,' a sound signal S corresponding to the attribute information of 'a male and a low pitch voice,' a sound signal S corresponding to the attribute information of 'a female and a high pitch voice,' a sound signal S corresponding to the attribute information of 'a female and a middle pitch voice,' and a sound signal S corresponding to the attribute information of 'a female and a low pitch voice' from the sound database 21 per kind, acquires these six kinds of sound signals S from the sound database 21, and loads the acquired sound signals in the RAM 23. In the following, the six kinds of sound signals S loaded in the RAM 23 through this acquisition process will be referred to as sound signals Sa, Sb, Sc, Sd, Se, and Sf for the convenience of description.

Figure 4:
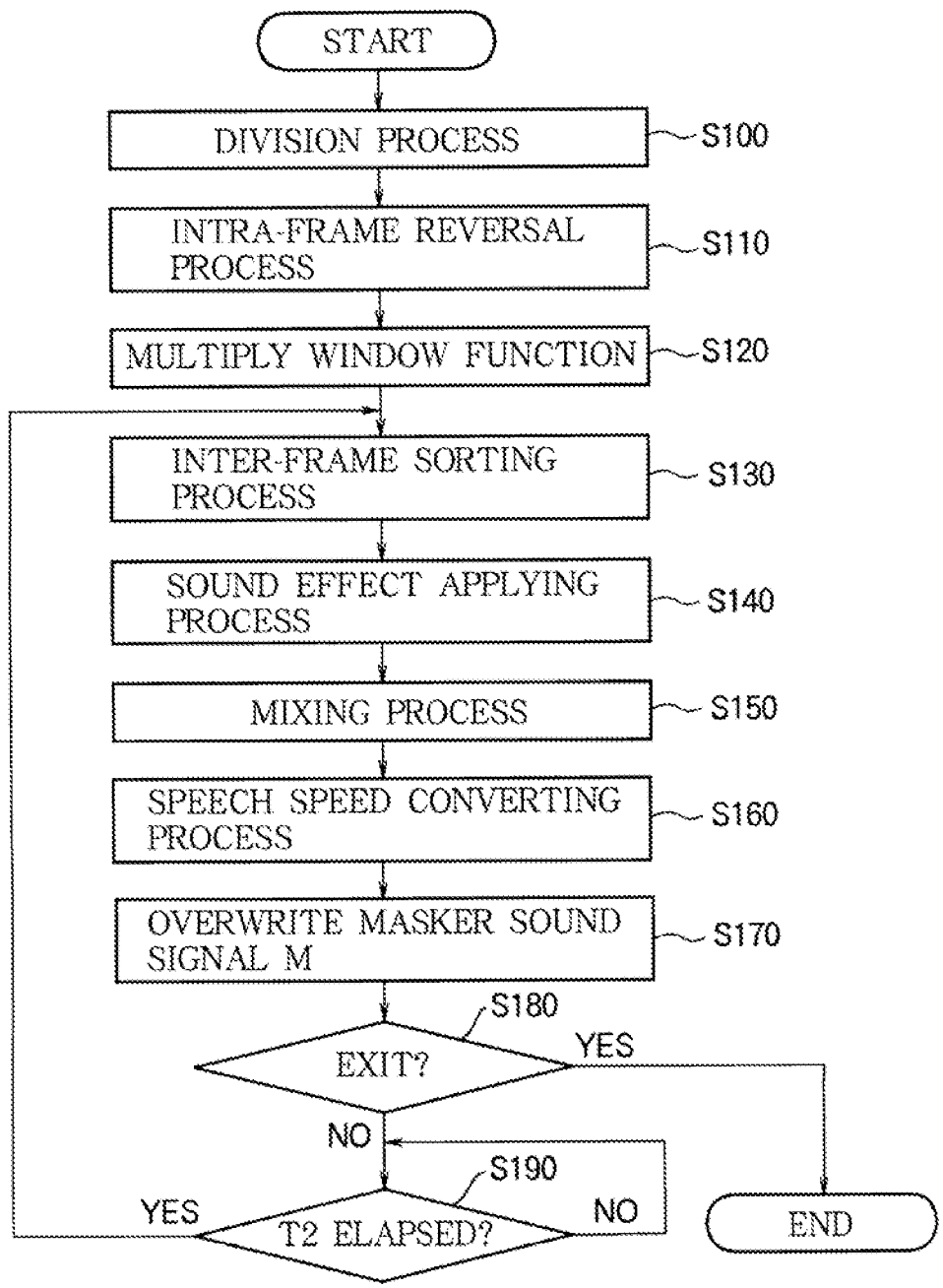
FIG. 4 is a flow chart illustrating the operation of the masker sound generation apparatus according to the first embodiment of the present invention.

In the generation process, the CPU 22 performs the processes of Step S100 to Step S120 shown in FIG. 4 with respect to the six kinds of sound signals Sa, Sb, Sc, Sd, Se, and Sf, as objects to be processed. Subsequently, the CPU 22 repeats loop processes of Step S130 to Step S190 shown in FIG. 4 per time length T2 (for example, T2=1 minute). Hereinafter, the processes of Step S100 to Step S190 will be described in detail.

Figure 5:
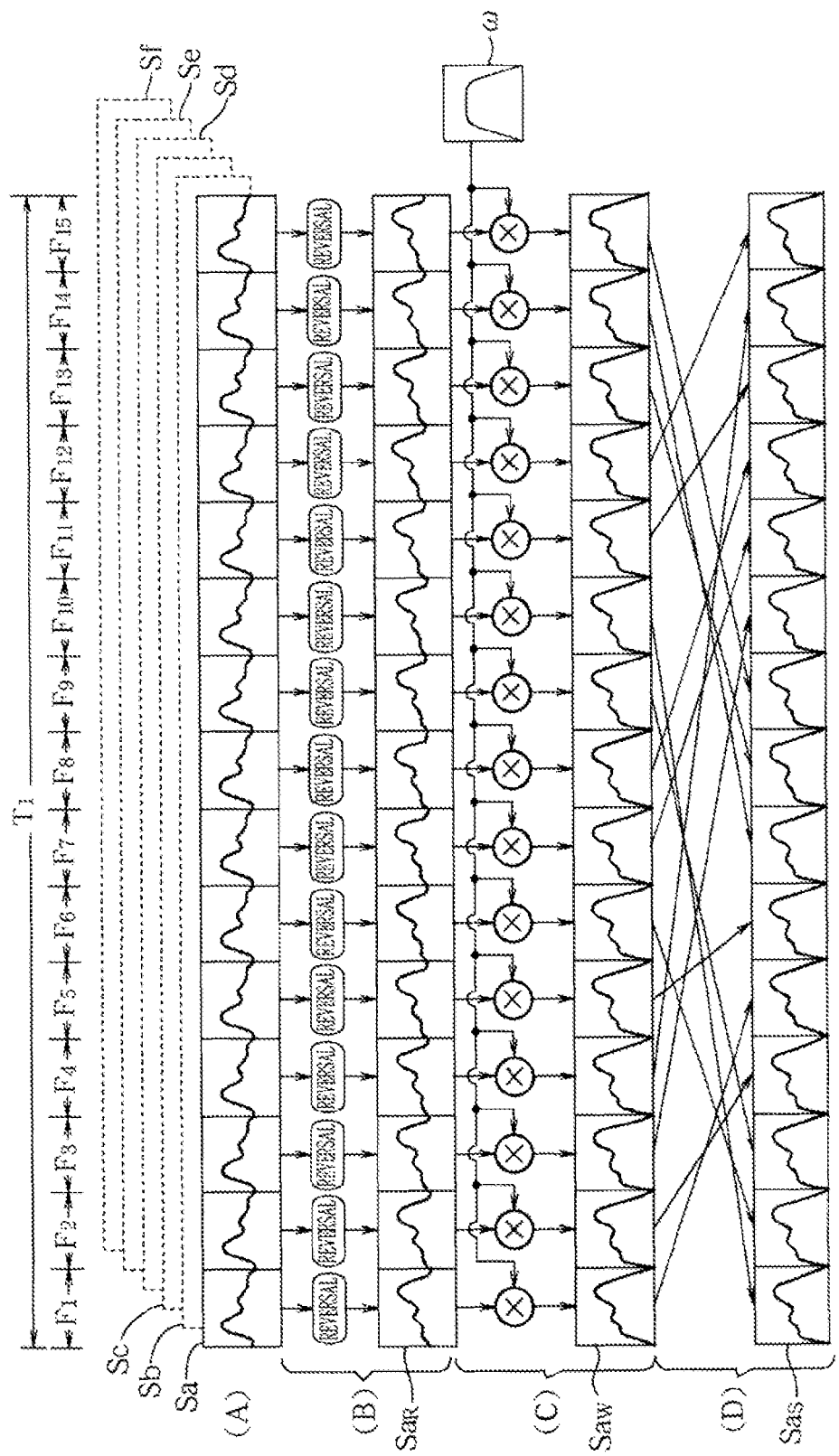
FIG. 5 is a view illustrating a sound signal process performed by the masker sound generation apparatus of FIG. 4.

First, the CPU 22 divides each of the six kinds of sound signals Sa, Sb, Sc, Sd, Se, and Sf into frames $F_i$ (i=1~N) to the number of N(N=T1/T3), each having a length of time length T3 (for example, T3=100 milliseconds), as shown in FIG. 5(A) (S100). Meanwhile, in FIG. 5(A), a case of N=15 is shown in order to avoid complexity of the drawing.

The CPU 22 performs an intra-frame reversal process, as shown in FIG. 5(B) (S110). The intra-frame reversal process is a process of generating sound signals $Sa_R$, $Sb_R$, $Sc_R$, $Sd_R$, $Se_R$, and $Sf_R$ obtained by reversing the arrangement of sample data (the sound signal fraction) in the frames $F_i$ of each of the sound signals Sa, Sb, Sc, Sd, Se, and Sf.

Upon completion of the intra-frame reversal process, the CPU 22 multiplies the results of the intra-frame reversal process, i.e., sound signals $Sa_R$, $Sb_R$, $Sc_R$, $Sd_R$, $Se_R$, and $Sf_R$, by a window function ω, as shown in FIG. 5(C) (S120). This window function ω is provided for waveform shaping to smoothly achieve the coupling between the divided frames $F_i$ (divided sections).

Next, the CPU 22 performs a inter-frame sorting process with respect to sound signals $Sa_W$, $Sb_W$, $Sc_W$, $Sd_W$, $Se_W$, and $Sf_W$, as objects to be processed, obtained by multiplying the sound signals $Sa_R$, $Sb_R$, $Sc_R$, $Sd_R$, $Se_R$, and $Sf_R$ by the window function ω, as shown in FIG. 5(D) (S130). In the inter-frame sorting process, the CPU 22 generates sound signals $Sa_S$, $Sb_S$, $Sc_S$, $Sd_S$, $Se_S$, and $Sf_S$ obtained by randomly sorting the arrangement of the frames $F_i$ (i=1~15) of each of the sound signals $Sa_W$, $Sb_W$, $Sc_W$, $Sd_W$, $Se_W$, and $Sf_W$.

Hereinafter, the concrete steps of an example of the inter-frame sorting process with respect to the sound signal $Sa_W$, as an object to be processed, will be described. In a case where the number N of frames obtained by dividing the sound signal $Sa_W$ is 15, the CPU 22 generates a random number sequence consisting of numbers ranging from 1 to 15. The CPU 22 reads the 15 random numbers from the first in order. When the first random number is 8, the CPU 22 takes the first frame before sorting as the eighth frame after sorting, and, when the second random number is 4, the CPU 22 takes the second frame before sorting as the fourth frame after sorting . . . . In this way, the CPU 22 decides the order of the frames after sorting depending on the random number sequence. A sound signal obtained by sorting the first to fifteenth frames is taken as a sound signal $Sa_S$. In this embodiment, a plurality of kinds of random number sequences having different random number arrangements (in a case where N=15, all of the random number sequences consist of 15 random numbers) are prepared so as to alter the sorting manner. Whenever the inter-frame sorting process is performed, the kind of the random number sequence used in the sorting process is changed.

In the same manner, the CPU 22 performs the inter-frame sorting process with respect to each of the sound signals $Sb_W$, $Sc_W$, $Sd_W$, $Se_W$, and $Sf_W$, as objects to be processed.

Upon completion of the inter-frame sorting process, the CPU 22 performs a sound effect apply process with respect to each of the sound signals $Sa_S$, $Sb_S$, $Sc_S$, $Sd_S$, $Se_S$, and $Sf_S$, as objects to be processed (S140). In the sound effect apply process, the CPU 22 generates sound signals $Sa_S'$, $Sb_S'$, $Sc_S'$, $Sd_S'$, $Se_S'$, and $Sf_S'$ obtained by applying a predetermined sound effect (for example, reverb) to the sound signals $Sa_S$, $Sb_S$, $Sc_S$, $Sd_S$, $Se_S$, and $Sf_S$ generated as the result of the inter-frame sorting process. Upon completion of the sound effect apply process, the CPU 22 performs a mixing process (S150). In the mixing process, the CPU 22 mixes the sound signals $Sa_S'$, $Sb_S'$, $Sc_S'$, $Sd_S'$, $Se_S'$, and $Sf_S'$, with respect to which the sound effect apply process has been performed, at a predetermined mixing ratio (for example, 1:1:1:1:1:1) and takes the mixed signal as a masker sound signal M. Upon completion of the mixing process, the CPU 22 performs a speech speed converting process (S160). In the speech speed converting process, the CPU 22 extends the time axis of the masker sound signal M, generated by the mixing process, per time length T1 and takes the masker sound signal M, the time axis of which has been extended per time length T1, as a masker sound signal M per time length T1' (T1'>T1). More specifically, in this speech speed converting process, the CPU 22 duplicates the frames $F_i$ of a normal sound waveform portion excluding a rising sound waveform portion and a falling sound waveform portion, among the frames F$_i$ (i=1~15) of the masker signal sound M, as an object to be processed, as much as number necessary to compensate for a time difference between the time length T1 and the time length T1' and inserts duplicated frames F$_i$' between the frames F$_i$ and F$_{i+1}$ of the normal sound waveform portion.

The CPU 22 outputs the masker sound signal M, with respect to which the speech speed converting process has been performed, and overwrites the output masker sound signal M in the buffer 13 (S170). When a detection signal S$_{OUT}$ indicating that the speaker has left the region A is not received from the presence sensor 30 (S180: No) and a time length T2 (T2=1 minute) lapses after Step S130 is performed (S190: Yes), the CPU 22 returns to Step S130 and repeats subsequent processes. Upon receipt of the detection signal S$_{OUT}$ from the presence sensor 30 (S180: Yes), on the other hand, the CPU 22 instructs to the sounding controller 14 to stop reading the masker sound signal M such that the process is ended.

This embodiment as described above has the following effects.

First, in this embodiment, a masker sound signal M is generated from six kinds of sound signals Sa, Sb, Sc, Sd, Se, and Sf. Consequently, it is possible to achieve a high masking effect in the region B even in a case where a plurality of speakers exhibiting different voice properties is present in the region A.

Second, in this embodiment, a inter-frame sorting process with respect to sound signals Sa$_W$, Sb$_W$, Sc$_W$, Sd$_W$, Se$_W$, and Sf$_W$, as objects to be processed, is repeated per time length T2, and sound signals Sa$_S$, Sb$_S$, Sc$_S$, Sd$_S$, Se$_S$, and Sf$_S$ obtained by randomly changing the arrangement of the frames F$_i$ (i=1~15) through the inter-frame sorting process are discharged into the region B as a masker sound signal M. Also, in this embodiment, the inter-frame sorting manner is altered each time the inter-frame sorting process (Step S130) is performed. As a result, an auditory sense of the masker signal sound M discharged into the region B is changed per time length T2. Consequently, it is possible for people present in the region B to feel less of a sense of incongruity than in a case where a masker sound signal M having the same arrangement of frames F$_i$ (i=1~15) is continuously discharged into the region B for a long period of time.

Third, in this embodiment, sound signals Sa$_S$', Sb$_S$', Sc$_S$', Sd$_S$', Se$_S$', and Sf$_S$' are mixed to obtain a masker sound signal M, and then the time axis of the masker sound signal M is extended. The masker sound signal M, the time axis of which has been extended, is discharged into the region B. In a case where an arrangement changing process (Step S110 and Step S130) is performed with respect to a sound signal indicating the voice of a person, the processed sound signal generally exhibits voice properties similar to the voice of a person who speaks with a fast rate of speech. According to this embodiment, however, it is possible to alleviate an impression that the voice of such a person who speaks with a fast rate of speech is heard. Also, according to this embodiment, it is not necessary to carefully select sound signals in which it is difficult to exhibit an impression of rapid utterance and to store such sound signals in the sound database 21 in a case where the arrangement is changed.

Fourth, in this embodiment, six kinds of sound signals Sa$_S$', Sb$_S$', Sc$_S$', Sd$_S$', Se$_S$', and Sf$_S$' are mixed, and a sound effect is applied to the mixed sound signal. A masker sound signal M obtained by applying the sound effect to the mixed sound signal is acoustically similar to a voice (a target sound T) to which a spatial sound effect (reverb) is applied through the transmission of the voice to the region B. Consequently, it is possible to prevent a person who is present in a region into which a masker sound is discharged from feeling a sense of incongruity, thereby achieving a high masking effect in such a region.

Second Embodiment

Figure 6:
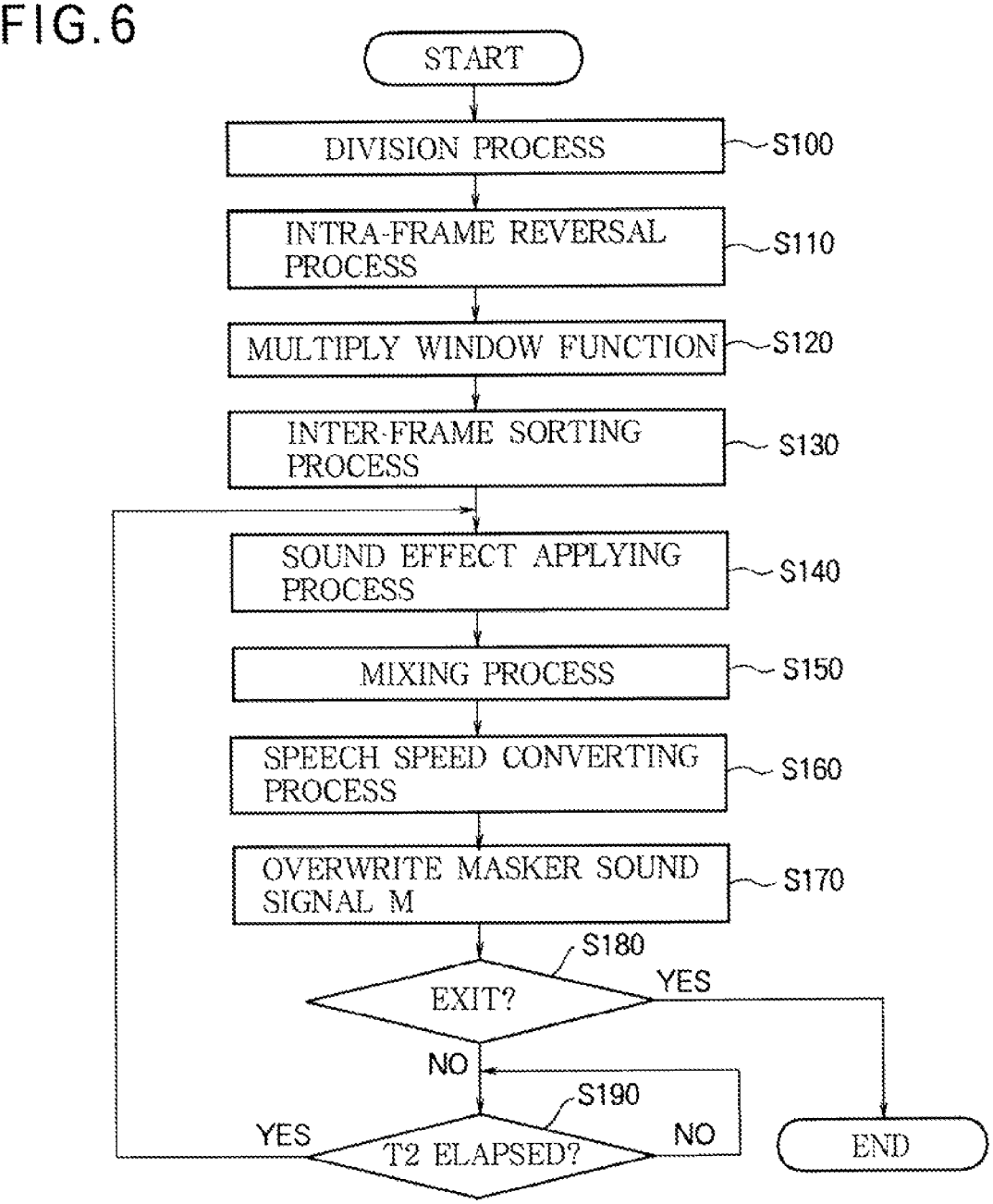
FIG. 6 is a flow chart illustrating the operation of the masker sound generation apparatus according to the second embodiment of the present invention.
Figure 7:
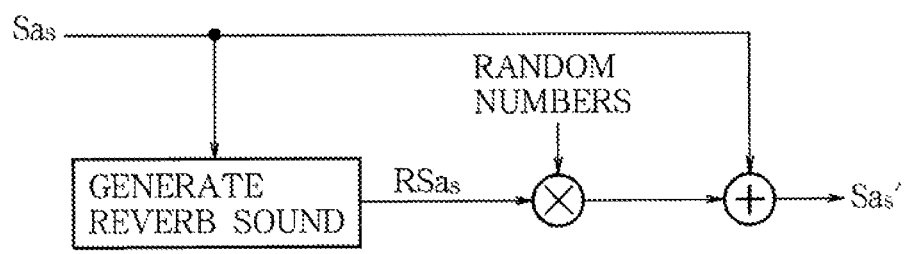
FIG. 7 is a view illustrating a sound signal process performed by the masker sound generation apparatus of FIG. 6.

Next, a second embodiment of the present invention will be described. In a generation process of this embodiment, as shown in FIG. 6, the CPU 22 performs a inter-frame sorting process at Step S130 and then repeats loop processes of Step S140 to Step S190 per time length T2 with respect to sound signals Sa$_S$, Sb$_S$, Sc$_S$, Sd$_S$, Se$_S$, and Sf$_S$, as objects to be processed, obtained by sorting frames F$_i$ (i=1~15) through the inter-frame sorting process. In this case, the CPU 22 randomly changes the depth (a level ratio of a reverb sound to a direct sound) of reverb, which is a sound effect, each time a sound effect applying process is performed at Step S140 of the loop process. More specifically, as shown in FIG. 7, the CPU 22 performs a process of generating a reverb sound signal RSa$_S$ from the sound signal Sa$_S$ in the sound effect applying process. In this process, the sound signal Sa$_S$ is delayed to obtain delayed sound signals DSa$_{S-n}$ (n=1, 2 . . . ), and the delayed sound signals DSa$_{S-n}$ (n=1, 2 . . . ) are added to obtain a reverb sound signal RSa$_S$. Next, random numbers are generated, the product of the random numbers and the reverb sound signal RSa$_S$ is added to the sound signal Sa$_S$ to obtain a sound signal Sa$_S$' to which the sound effect has been applied. Subsequently, in the same manner, the CPU 22 adds the products of random numbers which have been individually generated and reverb sound signals RSb$_S$, RSc$_S$, RSd$_S$, RSe$_S$, and RSf$_S$ are added to the sound signals Sb$_S$, Sc$_S$, Sd$_S$, Se$_S$, and Sf$_S$, respectively, to obtain sound signals Sb$_S$', Sc$_S$', Sd$_S$', Se$_S$', and Sf$_S$'.

In this embodiment, the contents of the sound effect applying process (S140) are changed per time length T2, with the result that an auditory sense of a masker sound signal M discharged into the region B is changed per time length T2. Consequently, it is possible to prevent a person who is present in the region B from easily feeling a sense of incongruity.

Third Embodiment

Figure 8:
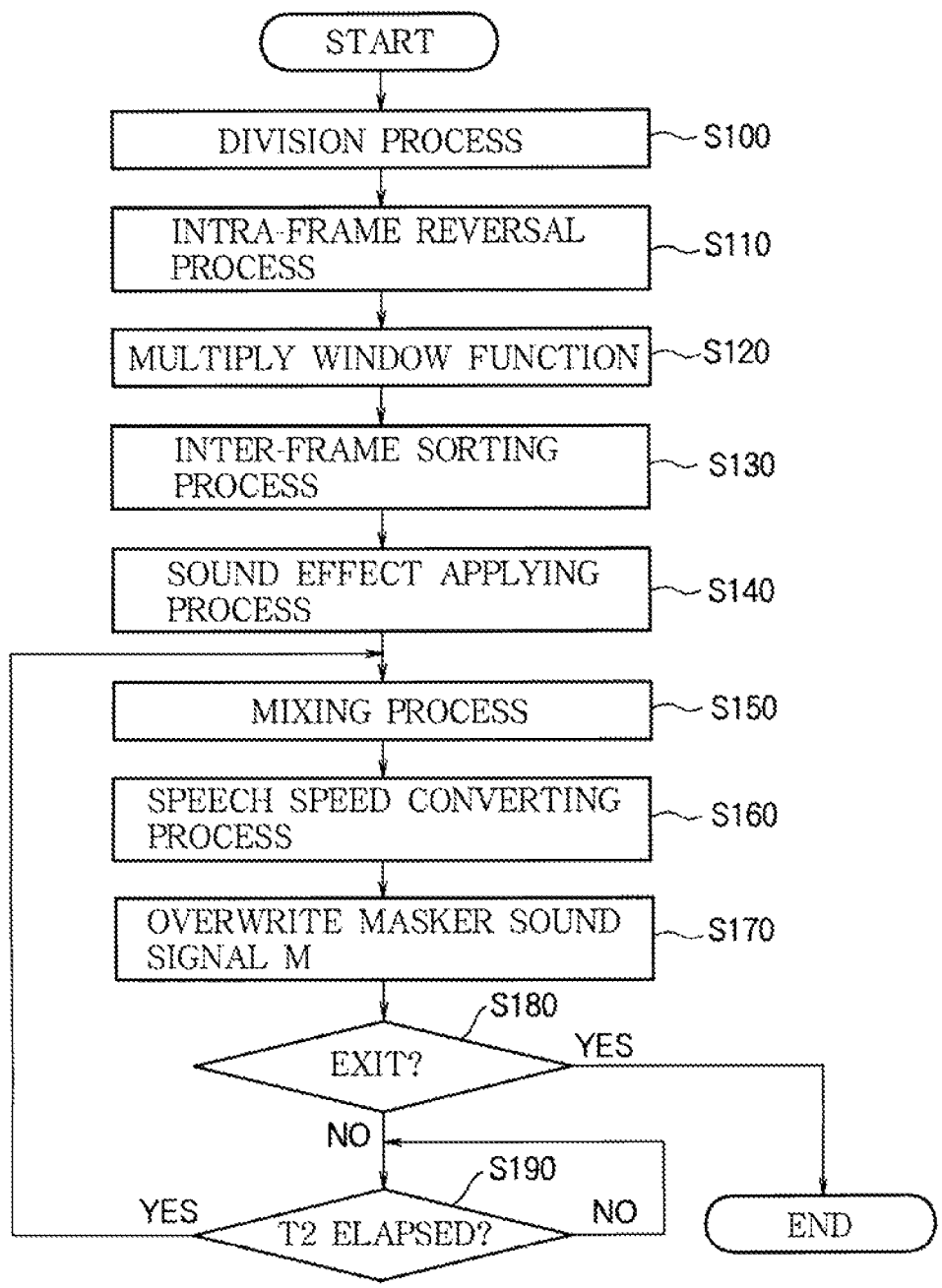
FIG. 8 is a flow chart illustrating the operation of the masker sound generation apparatus according to the third embodiment of the present invention.

Next, a third embodiment of the present invention will be described. In a generation process of this embodiment, as shown in FIG. 8, the CPU 22 performs a sound effect applying process of Step S140 and then repeats loop processes of Step S150 to Step S190 per time length T2 with respect to sound signals Sa$_S$', Sb$_S$', Sc$_S$', Sd$_S$', Se$_S$', and Sf$_S$', as objects to be processed, to which a sound effect has been applied through the sound effect applying process. In this case, the CPU 22 randomly changes a mixing ratio of the sound signals Sa$_S$', Sb$_S$', Sc$_S$', Sd$_S$', Se$_S$', and Sf$_S$' each time a mixing process is performed at Step S150 of the loop process. More specifically, the CPU 22 generates six kinds of random numbers (excluding 0) and takes each of the random numbers as a mixing ratio of each of the sound signals Sa$_S$', Sb$_S$', Sc$_S$', Sd$_S$', Se$_S$', and Sf$_S$' in the mixing process.

In this embodiment, the contents of the mixing process (S150) are changed per time length T2, with the result that an auditory sense of a masker sound signal M discharged into the region B is changed per time length T2. Consequently, it is possible to prevent a person who is present in the region B from easily feeling a sense of incongruity.

Fourth Embodiment

Figure 9:
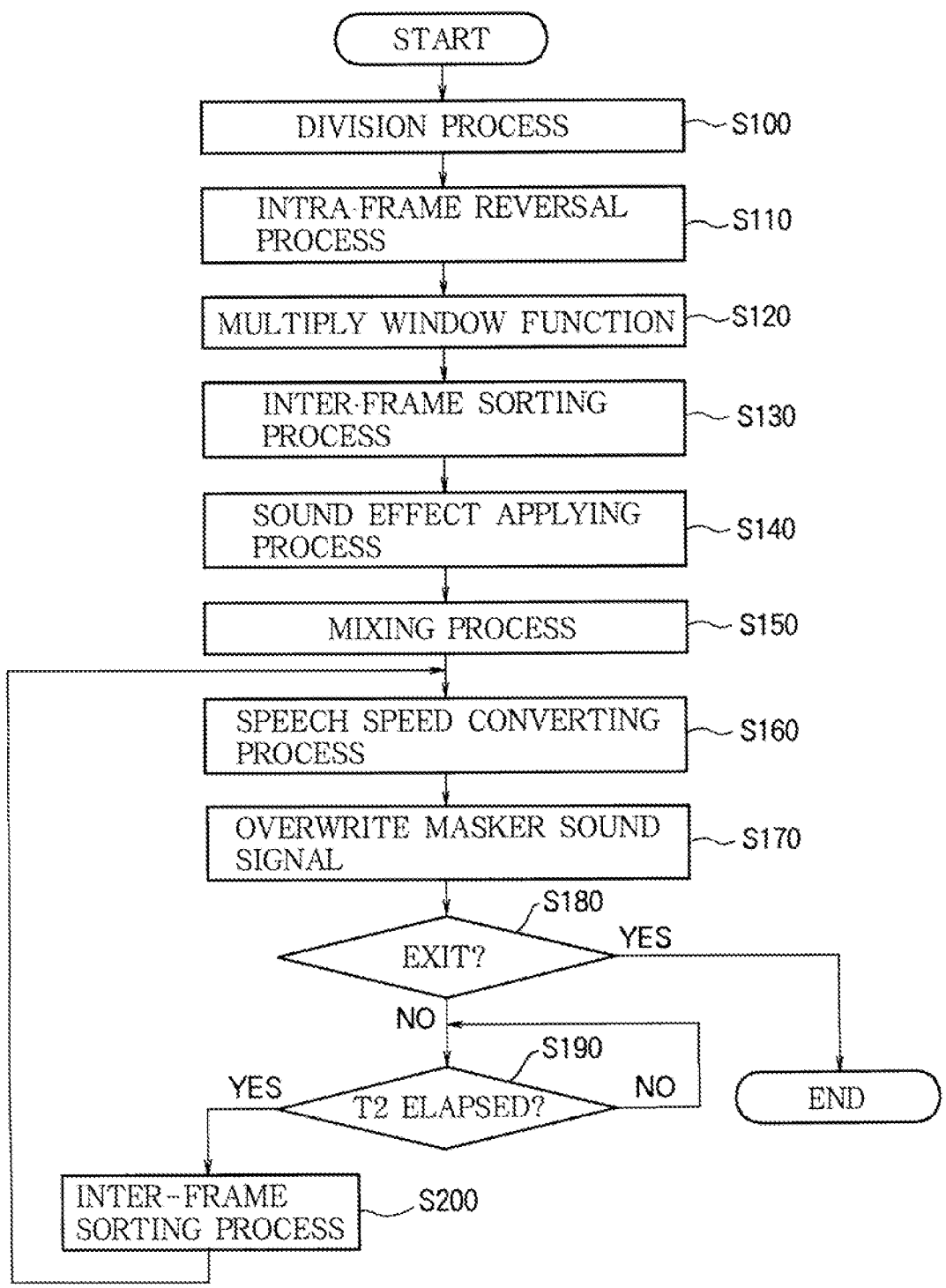
FIG. 9 is a flow chart illustrating the operation of the masker sound generation apparatus according to the fourth embodiment of the present invention.

Next, a fourth embodiment of the present invention will be described. In a generation process of this embodiment, as shown in FIG. 9, the CPU 22 performs a mixing process of Step S150 and then repeats loop processes of Step S160 to Step S200 per time length T2. The contents of Step S160 to Step S190 of the loop process are identical to those of Step S160 to Step S190 of the first embodiment. That is, when a detection signal $S_{OUT}$ indicating that the speaker has left the region A is not received from the presence sensor 30 (S180: No) and a time length T2 lapses (S190: Yes), the CPU 22 advances to Step S200.

At Step S200, the CPU 22 performs a inter-frame sorting process with respect to a masker sound signal M, as an object to be processed, which is obtained as the result of the mixing process of Step S150. In the inter-frame sorting process of Step S200, the CPU 22 divides the masker sound signal M into frames $F_i$ (i=1~15) again and generates a masker sound signal M obtained by randomly sorting the divided frames $F_i$ (i=1~15). After the inter-frame sorting process of Step S200 is performed, the CPU 22 returns to Step S160, performs a speech speed converting process with respect to the newly generated masker sound signal M, advances to Step 170, and overwrites the previous masker sound signal M in the buffer 13 by the new masker sound signal M, thereby updating the masker sound signal M.

In this embodiment, a frame sorting manner is altered per time length T2, with the result that an auditory sense of a masker sound signal M discharged into the region B is changed per time length T2. Consequently, it is possible to prevent a person who is present in the region B from easily feeling a sense of incongruity.

Fifth Embodiment

Figure 10:
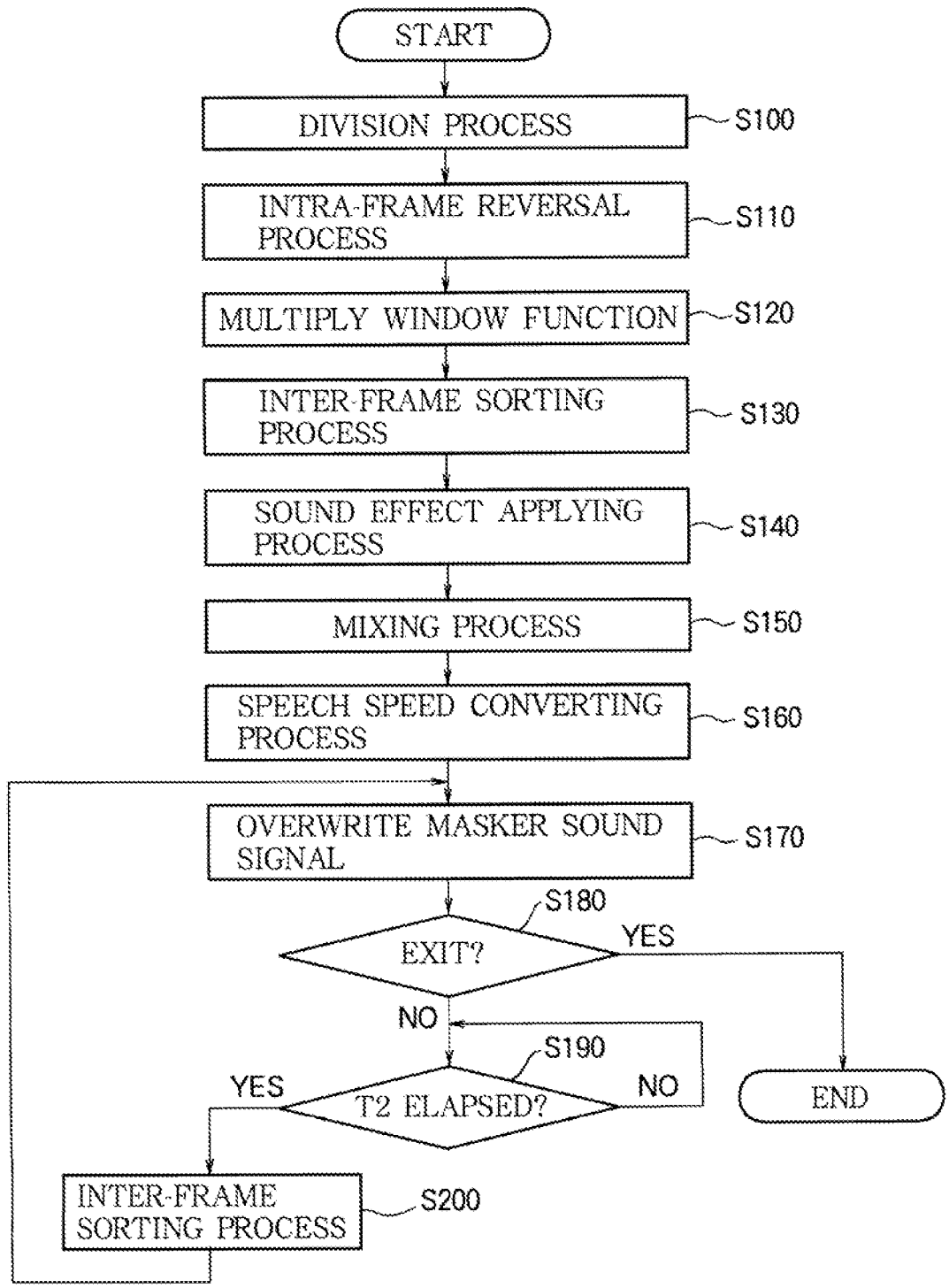
FIG. 10 is a flow chart illustrating the operation of the masker sound generation apparatus according to the fifth embodiment of the present invention.

Next, a fifth embodiment of the present invention will be described. In a generation process of this embodiment, as shown in FIG. 10, the CPU 22 performs a speech speed converting process at Step S160 and then repeats loop processes of Step S170 to Step S200 per time length T2. In a inter-frame sorting process of Step S200 of the loop process, the CPU 22 performs a inter-frame sorting process with respect to a masker sound signal M, as an object to be processed, the time axis of which has been extended through the speech speed converting process of Step S160. The contents of the inter-frame sorting process of Step S200 are identical to those of the corresponding process of the fourth embodiment.

Even in this embodiment, a frame sorting manner is changed per time length T2, with the result that an auditory sense of a masker sound signal M discharged into the region B is changed per time length T2. Consequently, it is possible to prevent a person who is present in the region B from easily feeling a sense of incongruity.

Although the first to fifth embodiments of the present invention were described as stated above, other embodiments may be provided, for example, as follows.

(1) In the masker sound generation apparatus 10 according to the first to fifth embodiments, a plurality of selection items may be provided with respect to a plurality of kinds of attributes, such as gender and voice pitch, a selection support unit for receiving the selection of the selection item of at least one kind of attribute may be provided, and the CPU 22 may read one or more of sound signals recorded from a person having the attribute of the selection item selected by the selection supporting unit from the sound database 21, and generate a masker sound signal M using the read sound signals S.

This embodiment is operated, for example, as follows. First, a mixture of voices of a male having a high pitch voice, a male having a middle pitch voice, and a male having a low pitch voice, is stored in the sound database 21 such that the mixture corresponds to attribute information of 'a male,' a mixture of voices of a female having a high pitch voice, a female having a middle pitch voice, and a female having a low pitch voice, is stored in the sound database 21 such that the mixture corresponds to attribute information of 'a female,' a mixture of voices of a male and female having a high pitch voice is stored in the sound database 21 such that the mixture corresponds to attribute information of 'a high pitch voice,' a mixture of voices of a male and female having a middle pitch voice is stored in the sound database 21 such that the mixture corresponds to attribute information of 'a middle pitch voice,' and a mixture of voices of a male and female having a low pitch voice is stored in the sound database 21 such that the mixture corresponds to attribute information of 'a low pitch voice.'

In a case where one of the selection items (a male and a female) of gender has been selected by a manipulation support unit, the CPU 22 reads a sound signal S matching with the attribute information selected between 'a male' and 'a female' from the sound database 21, and generates a masker sound signal M using the sound signal S. Also, in a case where one of the selection items of the voice pitch (a high pitch voice, a middle pitch voice, and a low pitch voice) has been selected by the manipulation support unit, the CPU 22 reads a sound signal S matching with the attribute information selected among 'a high pitch voice,' 'a middle pitch voice,' and 'a low pitch voice' from the sound database 21, and generates a masker sound signal M using the read sound signal S.

According to this embodiment, it is possible to generate a masker sound signal M that provides a high masking effect with respect to the voice of a user even in a case where the user designates only the selection items of some of the plurality of kinds of attributes related to the user. Also, a plurality of kinds of sound signals S corresponding to a different kind of attribute information (for example, language or age) may be stored in the sound database 21, and the attribute information selected according to the designation of the manipulation unit may be used to generate a masker sound signal M.

(2) In the sound effect applying process of the first to fifth embodiments as described above, a plurality of kinds of sound effects, such as delay, harmony, distortion, different from reverb may be imparted to sound signals $Sa_S$, $Sb_S$, $Sc_S$, $Sd_S$, $Se_S$, and $Sf_S$.

(3) In the first to fifth embodiments as described above, the processes of Step S110 and Step S120 may be performed in reverse order such that the frames $F_i$ of each of the sound signals Sa, Sb, Sc, Sd, Se, and Sf are multiplied by a window function ω, and then the arrangement of sample data is reversed in each of the frames $F_i$.

(4) In the second embodiment as described above, each time the sound effect applying process is repeated, a combination of sound signals to which the sound effect is applied and sound signals to which the sound effect is not applied, among six kinds of sound signals $Sa_S$, $Sb_S$, $Sc_S$, $Sd_S$, $Se_S$, and $Sf_S$, may be changed. Also, each time the sound effect applying process is repeated, the kind of the sound effect applied to each of the six kinds of sound signals $Sa_S$, $Sb_S$, $Sc_S$, $Sd_S$, $Se_S$, and $Sf_S$ may be changed. Also, each time the sound effect applying process is repeated, a combination of frames $F_i$ to which the sound effect is applied and frames $F_i$ to which the sound effect is not applied, among frames $F_i$ (i=1~15) of each of the six kinds of sound signals $Sa_S$, $Sb_S$, $Sc_S$, $Sd_S$, $Se_S$, and $Sf_S$, may be changed.

(5) In the first embodiment as described above, the inter-frame sorting process was repeated per time length T2 with respect to each of the sound signals $Sa_W$, $Sb_W$, $Sc_W$, $Sd_W$, $Se_W$, and $Sf_W$, as objects to be processed. However, the inter-frame sorting process may be repeated during different time lengths $T2_a$, $T2_b$, $T2_c$, $T2_d$, $T2_e$ and $T2_f$ particular to a plurality of kinds of sound signals Sa, Sb, Sc, Sd, Se, and Sf, respectively. In this case, the time lengths $T2_a$, $T2_b$, $T2_c$, $T2_d$, $T2_e$ and $T2_f$ may have disjointed lengths (lengths having a ratio of relatively prime numbers such as 1:3:5). As a result, a period during which an auditory sense of a masker sound M discharged into the region B is changed is substantially increased with the result that it is possible to more effectively prevent a person who is present in the region B from feeling a sense of incongruity. In the same manner, in the second embodiment, the sound effect applying process of Step S140 may be repeated. In the third embodiment, the mixing process of Step S150 may be repeated. In the fourth and fifth embodiments, the inter-frame sorting process of Step S200 may be repeated during each of the time lengths $T2_a$, $T2_b$, $T2_c$, $T2_d$, $T2_e$ and $T2_f$.

(6) In the first to fifth embodiments as described above, the time length T2 per which the loop process was repeated was longer than the time length T1 of the voice used to generate a masker sound signal M (T2=1 minute, and T1=30 seconds). However, the time length T2 may be equal to the time length T1. Also, the time length T2 may be equal to the time length T1' (the length of the masker sound signal M with respect to which the speech speed converting process has been performed). Also, the time length T2 per which the loop process is repeated may be randomly decided using random numbers.

(7) In the first to fifth embodiments as described above, the sound effect applying process (S140) was performed with respect to all of the six kinds of sound signals $Sa_S$, $Sb_S$, $Sc_S$, $Sd_S$, $Se_S$, and $Sf_S$, as objects to be processed. However, the sound effect applying process may be performed selectively with respect to a part of the six kinds of sound signals $Sa_S$, $Sb_S$, $Sc_S$, $Sd_S$, $Se_S$, and $Sf_S$, as objects to be processed.

(8) In the first to fifth embodiments as described above, the intra-frame reversal process (S110), the window function multiplication process (S120), the inter-frame sorting process (S130), and the sound effect applying process (S140) were performed with respect to all of the six kinds of sound signals $Sa_S$, $Sb_S$, $Sc_S$, $Sd_S$, $Se_S$, and $Sf_S$, as objects to be processed, and sound signals $Sa_S'$, $Sb_S'$, $Sc_S'$, $Sd_S'$, $Se_S'$, and $Sf_S'$ obtained as the result of the processes were mixed to obtain a masker sound signal M. However, the respective processes of Step S110 to Step S140 may be performed with respect to some (for example, sound signals $Sa_S$, $Sb_S$, $Sc_S$, and $Sd_S$) of the six kinds of sound signals $Sa_S$, $Sb_S$, $Sc_S$, $Sd_S$. $Se_S$, and $Sf_S$. On the other hands, any one of the processes of Step S110 to Step S140 is not performed with respect to the remaining sound signals $Se_S$ and $Sf_S$, and sound signals $Sa_S'$, $Sb_S'$, $Sc_S'$, and $Sd_S'$ obtained as the result of the respective processes of Step S110 to Step S140 are mixed with the sound signals $Se_S$ and $Sf_S$ to obtain a masker sound signal M. In this case, the intra-frame reversal process (S110), the window function multiplication process (S120), or the inter-frame sorting process (S130) may be performed with respect to some or all of the sound signals $Sa_S$, $Sb_S$, $Sc_S$, and $Sd_S$, and sound signals obtained as the result of the process may be mixed.

(9) In the first to fifth embodiments as described above, the inter-frame sorting process (S130) was performed after completion of the intra-frame reversal process (S110). However, the intra-frame reversal process may be performed after completion of the inter-frame sorting process.

(10) In the first to fifth embodiments as described above, first six kinds of sound signals $Sa_S$, $Sb_S$, $Sc_S$, $Sd_S$, $Se_S$, and $Sf_S$ may be mixed, then the respective processes of Step S110 to Step S140 may be performed with respect to a sound signal, as an object to be processed, obtained as the result of the mixing process, and a sound signal obtained as the result of the respective processes of Step S110 to Step S140 may be taken as a masker sound signal M.

(11) In the first to fifth embodiments as described above, each time the presence sensor 30 detects that a speaker had entered the region A, sound signals $Sa_S$, $Sb_S$, $Sc_S$, $Sd_S$, $Se_S$, and $Sf_S$ were read from the sound database 21, the respective processes of Step S100 to Step S190 were performed with respect to the sound signals $Sa_S$, $Sb_S$, $Sc_S$, $Sd_S$, $Se_S$, and $Sf_S$, as objects to be processed, to obtain a masker sound signal M, and the masker sound signal M was discharged into the region B. However, the masker sound signal M obtained by performing the respective processes of Step S100 to Step S190 may be stored in a memory, and, each time the presence sensor 30 detects that a speaker has entered the region A, the masker sound signal M may be read from the memory and repeatedly discharged into the region B. In this case, a series of processes of FIG. 4, 6, 8, 9, or 10 may be repeated a plurality of times with respect to the sound signals $Sa_S$, $Sb_S$, $Sc_S$, $Sd_S$, $Se_S$, and $Sf_S$ having a length of time length T1 (T1=30 seconds) to generate a masker sound signal M per time length T4 (for example, T4=10 minutes), which is much longer than the time length T1, and the masker sound signal M per time length T4 may be stored in the memory for future use.

(12) In the first to fifth embodiments as described above, the present invention was applied to prevent voice leakage from the region A to the region B divided from the region A by the partition 50 such that the region B is located outside the region A. However, in a case where two regions A' and B' between which the partition 50 is not disposed are provided, the present invention may be applied to effectively prevent sound generated in one region A' (or B') from being transmitted to the other region B' (or A'). Also, the masker sound generation apparatus 10 may be installed in a room separated from the outside by four walls and a ceiling, and a masker sound signal M generated by the masker sound generation apparatus 10 may be discharged to a region outside the walls. Also, in communication devices (for example, mobile phones, IP phones, interphones, etc.) which enable speakers present in different spaces to communicate with each other, the present invention may be applied to effectively prevent voices of the respective speakers from being transmitted to the surroundings. This embodiment may be achieved, for example, by installing the masker sound generation apparatus 10 according to the first to fifth embodiments in a communication device such that a masker sound signal M generated by the masker sound generation apparatus 10 is discharged around a speaker. In this case, the speaker may wear an earphone, or the directivity of a speaker unit of the communication device may be controlled to prevent the masker sound signal M from being transmitted to the opposite party of communication, thereby preventing conversation muddling.

(13) In the first to fifth embodiments as described above, a microphone may be installed in the region A. In this case, the CPU 22 may acquire a sound signal recorded through the microphone in the region A in the acquisition process, and may generate a masker sound signal M from the acquired sound signal in the generation process.

(14) In the first to fifth embodiments as described above, the presence sensor 30 may be a sound sensor (for example, a microphone for detecting a sound wave, a vibration pickup for detecting vibration, etc.) or a bio sensor (for example, a temperature sensor for detecting temperature of a living body, an infrared sensor for detecting infrared rays of the living body, etc.). Also, a sound receiving and detecting apparatus having both the function of the microphone indicated in (15) and the function of the presence sensor 30 may be installed in the region A, and, upon detecting that a speaker has entered the region A, the sound receiving and detecting apparatus may generate a masker sound signal M using the received sound signal.

(16) In the first to fifth embodiments as described above, the hard disk 11 may be an external component of the masker sound generation apparatus 10. In this embodiment, sound signals Sa, Sb, Sc, Sd, Se, and Sf may be acquired from the sound database 21 in an external memory device via a network, and a masker sound signal M may be generated using the sound signals Sa, Sb, Sc, Sd, Se, and Sf. Also, the buffer 13, the sounding controller 14, the D/A converter 15, and/or the amplifier 16 may be external components of the masker sound generation apparatus 10. In this embodiment, for example, the masker sound signal M generated using the sound signals Sa, Sb, Sc, Sd, Se, and Sf may be output to the external memory device serving as the buffer 13 through various kinds of interfaces.

(18) In the first to fifth embodiments as described above, upon receipt of a detection signal $S_{IN}$ indicating that a speaker has entered the region A, the CPU 22 of the masker sound generation apparatus 10 performed the acquisition process and the generation process. However, when the detection signal $S_{IN}$ is received, a masker sound signal M stored in the hard disk 11 or a memory may be output from the speaker unit 31 without performing the acquisition process and the generation process.

(19) In the inter-frame sorting process of the first to fifth embodiments as described above, the random number sequence consisting of different numbers ranging from 1 to N was used to sort the frames. However, a random number sequence in which identical random numbers appear a plurality of times may be used to sort the frames. Also, when the first random number is 8, the eighth frame before sorting may be taken as the first frame after sorting, and, when the second random number is 4, the fourth frame before sorting may be taken as the second frame after sorting . . . . In this way, a frame to be selected may be decided among the frames before sorting depending on the random number sequence.

(20) In the second embodiment as described above, the CPU 22 changed the depth (a ratio of a reverb sound to a direct sound) of reverb each time the sound effect applying process was performed. However, the length of the reverb sound may be changed each time the sound effect applying process is performed. In this embodiment, the CPU 22 may change the intensity of delayed sound signals $DSa_{S-n}$ (n=1, 2 . . . ) obtained by delaying a sound signal $Sa_S$ to change the length (delay time) of the reverb sound each time the sound effect applying process is performed. Also, the CPU 22 may change the delay time of the delayed sound signals $DSa_{S-n}$ (n=1, 2 . . . ) obtained by delaying the sound signal $Sa_S$ to change the length (delay time) of the reverb sound each time the sound effect applying process is performed.

Sixth Embodiment

Next, the operation of a six embodiment will be described. In the same manner as in the first embodiment, a CPU 22 of a masker sound generation apparatus 10 performs an acquisition process and a generation process upon receipt of a detection signal $S_{IN}$ indicating that a speaker has entered a region A from a presence sensor 30. In the acquisition process, the CPU 22 selects a sound signal S corresponding to the attribute information of 'a male and a high pitch voice,' a sound signal S corresponding to the attribute information of 'a male and a middle pitch voice,' a sound signal S corresponding to the attribute information of 'a male and a low pitch voice,' a sound signal S corresponding to the attribute information of 'a female and a high pitch voice,' a sound signal S corresponding to the attribute information of 'a female and a middle pitch voice,' and a sound signal S corresponding to the attribute information of 'a female and a low pitch voice' from a sound database 21 per kind, acquires these six kinds of sound signals S from the sound database 21, and loads the acquired sound signals in a RAM 23. In the following, the six kinds of sound signals S loaded in the RAM 23 through this acquisition process will be referred to as sound signals Sa, Sb, Sc, Sd, Se, and Sf for the convenience of description.

Figure 11:
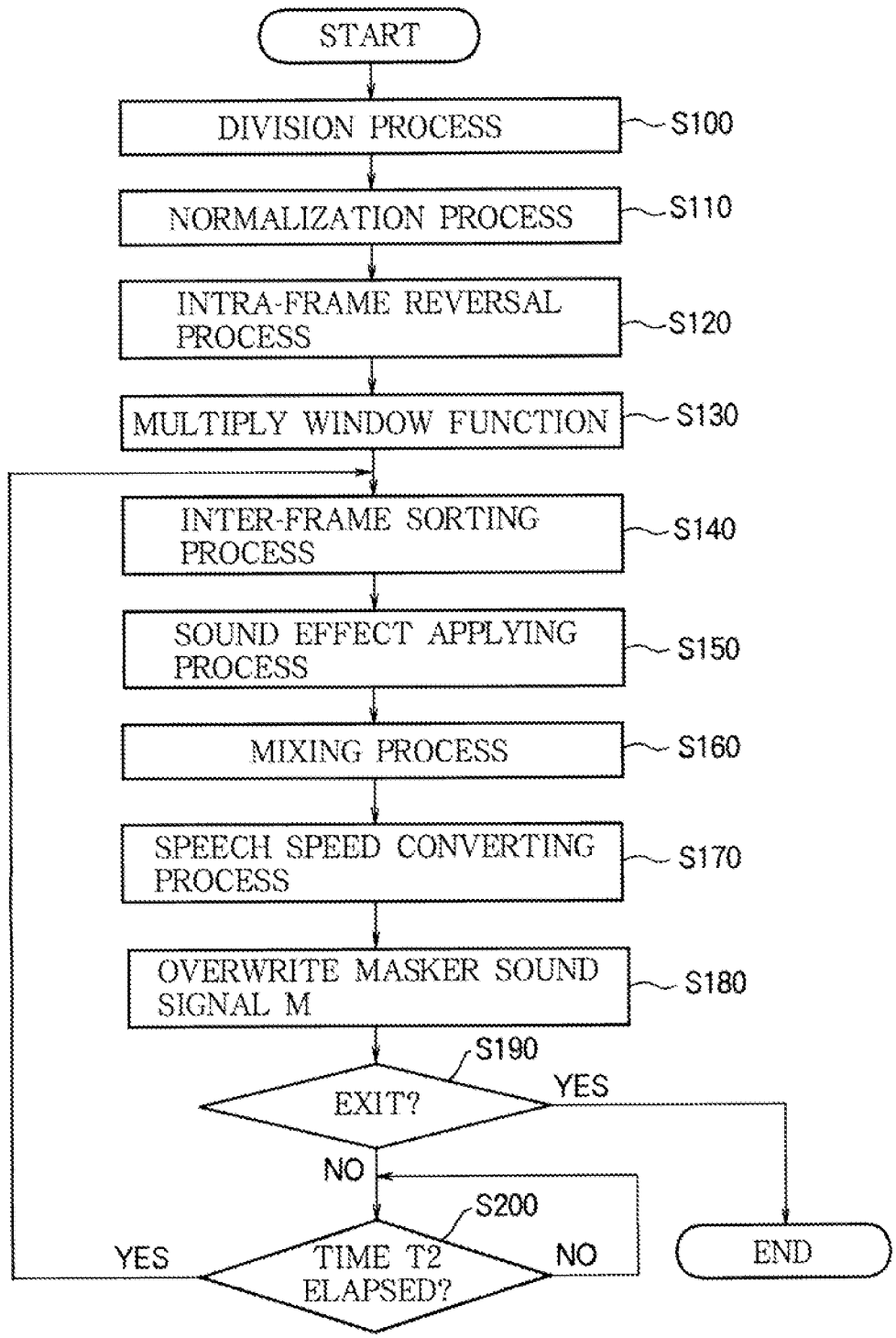
FIG. 11 is a flow chart illustrating the operation of the masker sound generation apparatus according to the sixth embodiment of the present invention.

In the generation process, the CPU 22 performs processes of Step S100 to Step S130 shown in FIG. 11 with respect to the six kinds of sound signals Sa, Sb, Sc, Sd, Se, and Sf, as objects to be processed. Subsequently, the CPU 22 repeats loop processes of Step S140 to Step S200 shown in FIG. 11 per time length T2 (for example, T2=1 minute). Hereinafter, the processes of Step S100 to Step S200 will be described in detail.

Figure 12:
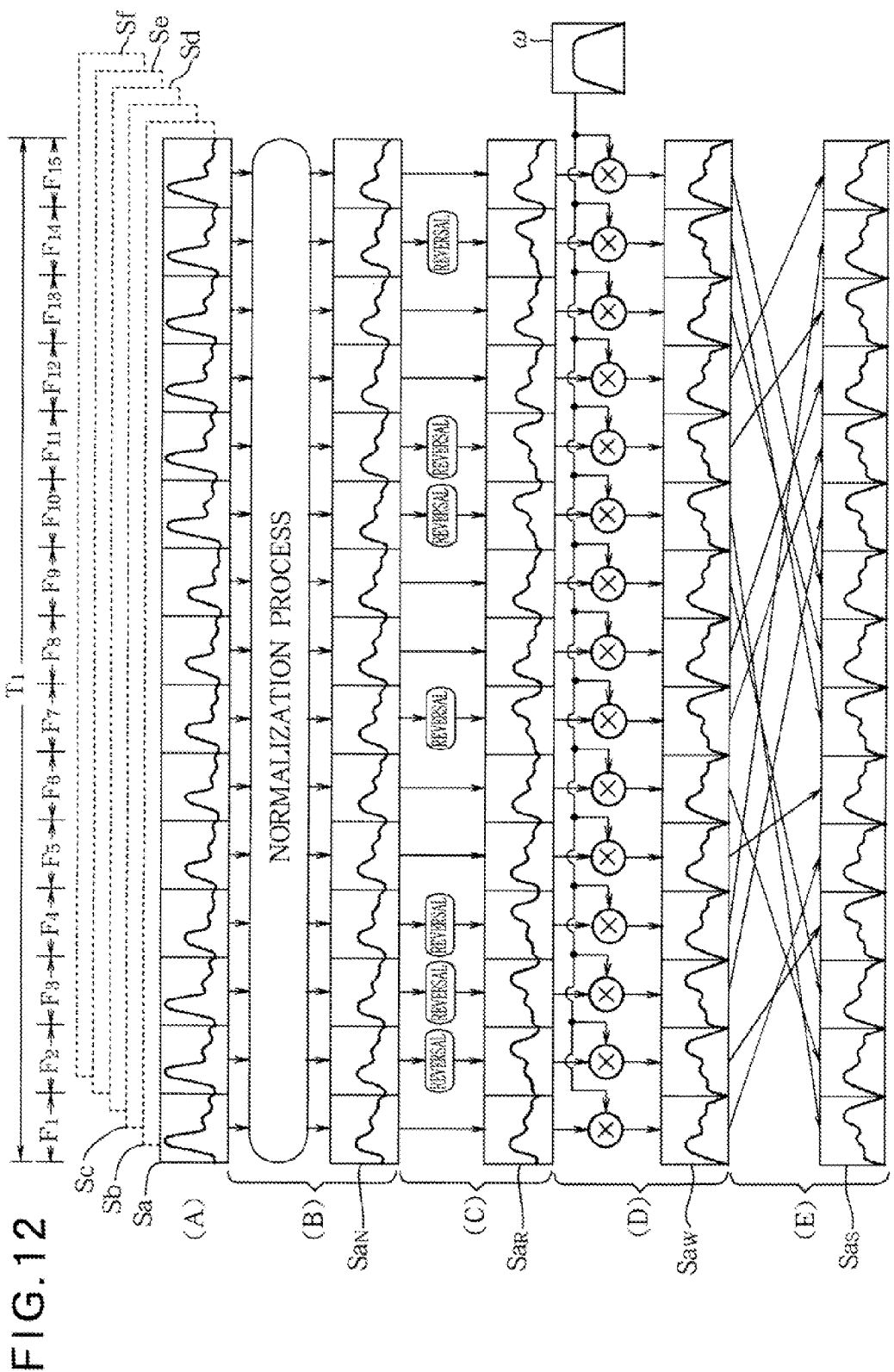
FIG. 12 is a view illustrating a sound signal process performed by the masker sound generation apparatus of FIG. 11.

First, the CPU 22 divides each of the six kinds of sound signals Sa, Sb, Sc, Sd, Se, and Sf into frames $F_i$ (i=1~N) to the number of N(N=T1/T3), each having a length of time length T3 (for example, T3=100 milliseconds), as shown in FIG. 12(A) (S100). Meanwhile, in FIG. 12(A), a case of N=15 is shown in order to avoid complexity of the drawing.

Next, the CPU 22 performs a normalization process as shown in FIG. 12(B) (S110). The normalization process is a process of correcting sample data in the respective frames $F_i$ of each of the sound signals Sa, Sb, Sc, Sd, Se, and Sf to limit fluctuation in time domain of sound volume in the respective frames $F_i$ within a predetermined range.

Hereinafter, the concrete steps of an example of the normalization process with respect to the sound signal Sa, as an object to be processed, will be described. In the normalization process, the CPU 22 performs a first correction process of multiplying respective sample data in the frames $F_i$ (i=1~15) obtained by dividing the sound signal Sa by a peak level correction coefficient $M_{PAEK}$ and a second correction process of multiplying the respective sample data, which have been multiplied by the peak level correction coefficient $M_{PAEK}$, by an average level correction coefficient $M_{AVE}$.

More specifically, in the first correction process, the CPU 22 detects the maximum peak of a sound waveform having a time length T1 represented by all of the frames $F_i$ (i=1~15) of the sound signal Sa, and obtains a sound volume level LPEAK of the detected maximum peak. Next, the CPU 22 takes the maximum value of the sound volume level acquired by one piece of the sample data as a sound volume level LMAX and takes a value obtained by subtracting the sound volume level LMAX from the sound volume level LPEAK as a peak level correction coefficient $M_{PAEK}$. Also, the CPU 22 multiplies the sample data in the frames $F_i$ (i=1~15) by the peak level correction coefficient $M_{PAEK}$. Here, in the first correction process, values obtained by expressing the respective sample data in terms of real numbers are multiplied by the coefficient in a case where the respective sample data logarithmically express the sound volume level, and the respective sample data are multiplied by the coefficient in a case where the respective sample data logarithmically express the sound volume level in terms of real numbers (the same conditions are applied to the second correction process).

Figure 13:
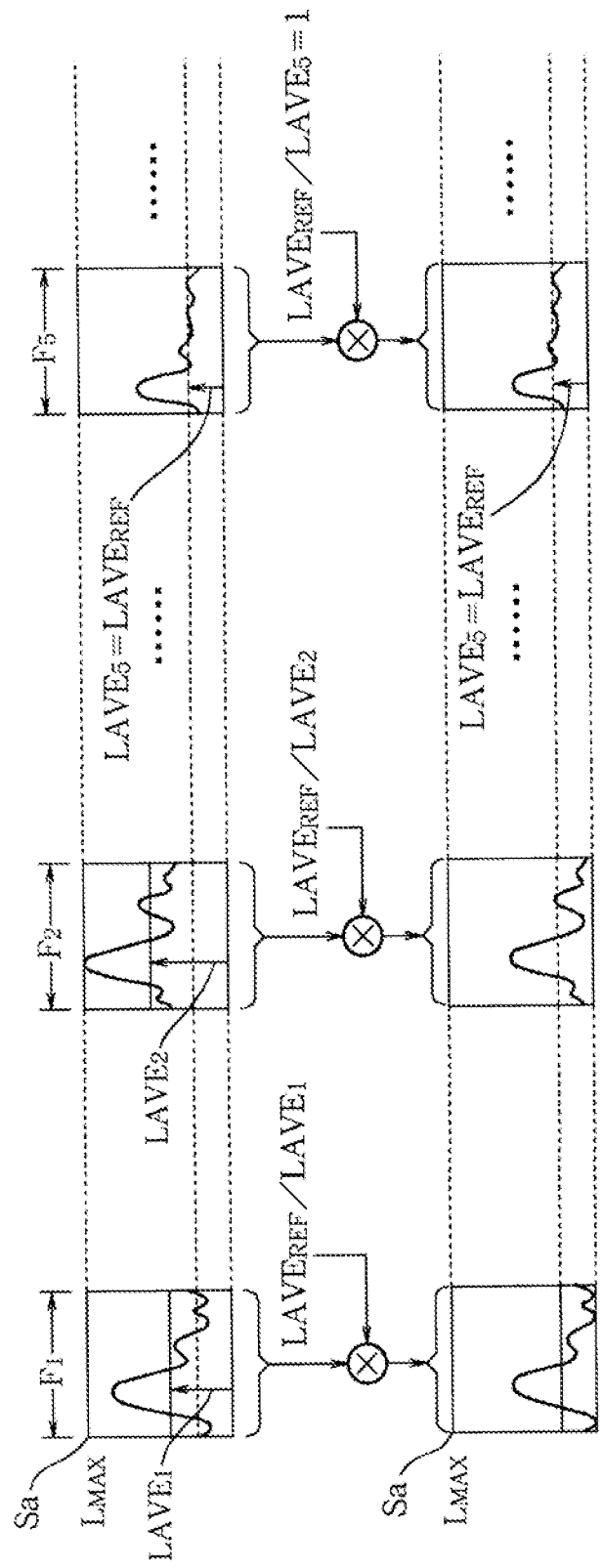
FIG. 13 is a view illustrating a sound signal process performed by the masker sound generation apparatus of FIG. 11.

Subsequently, in the second correction process, the CPU 22 obtains an average sound volume of a sound waveform having a time length T1/15 represented by sample data in each of the frames $F_i$ (i=1~15) of the sound signal Sa, which has been multiplied by the peak level correction coefficient $M_{PAEK}$, as an average sound volume level $LAVE_i$. Next, as shown in FIG. 13, the CPU 22 takes the minimum value (in an example of FIG. 13, the average sound volume level $LAVE_5$ of the frame $F_5$) of the average sound volume levels $LAVE_i$ (i=1~15) obtained with respect to the frames $F_i$ (i=1~15) as a representative value or reference value $LAVE_{REF}$ of the average sound volume levels $LAVE_i$, and takes respective values obtained by subtracting the reference value $LAVE_{REF}$ from the average sound volume levels $LAVE_i$ as average level correction coefficients $M_{AVE}$ of the respective frames $F_i$. Also, the CPU 22 multiplies the sample data in the respective frames $F_i$ (i=1~15) by the average level correction coefficients $M_{AVE}$ obtained with respect to the respective frames $F_i$.

In the same manner, the CPU 22 performs the normalization process with respect to the sound signals Sb, Sc, Sd, Se, and Sf, as objects to be processed.

The CPU 22 performs an intra-frame reversal process with respect to sound signals $Sa_N$, $Sb_N$, $Sc_N$, $Sd_N$, $Se_N$, and $Sf_N$, as objects to be processed, with respect to which the normalization process has been performed, as shown in FIG. 12(C) (S120). The intra-frame reversal process is a process of generating sound signals $Sa_R$, $Sb_R$, $Sc_R$, $Sd_R$, $Se_R$, and $Sf_R$ obtained by reversing the arrangement of sample data in some of the frames $F_i$ of each of the sound signals $Sa_N$, $Sb_N$, $Sc_N$, $Sd_N$, $Se_N$, and $Sf_N$.

Figure 15:
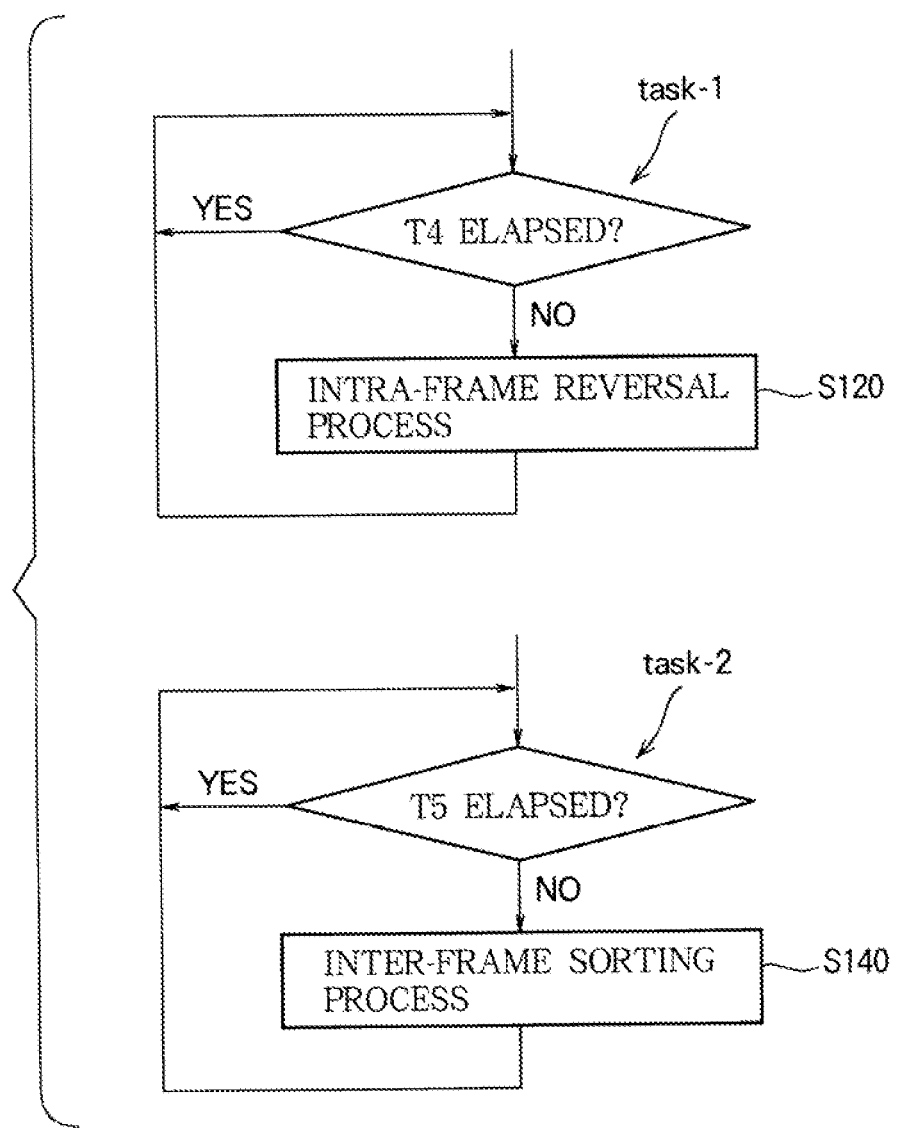
FIG. 15 is a view illustrating the operation of a masker sound generation apparatus according to another embodiment of the present invention.

Hereinafter, the concrete steps of an example of the intra-frame reversal process with respect to the sound signal $Sa_N$, as an object to be processed, will be described. First, the CPU 22 takes half (in an example of FIG. 12(C), 15/2≈7) the total number of the frames $F_i$ of the sound signal $Sa_N$ as the number Num of the frames $F_i$ necessary to reverse sample data, and generates random numbers in total of the number Num. Then, the CPU 22 reverses the sample data of the frames $F_i$ corresponding to the generated random numbers in total of Num. In an example of FIG. 12(C), sample data in a total of seven frames $F_i$ including a frame $F_2$, a frame $F_3$, a frame $F_4$, a frame $F_7$, a frame $F_{10}$, a frame $F_{11}$, and a frame $F_{14}$ are reversed as shown by a sound signal $Sa_R$.

In the same manner, the CPU 22 performs the intra-frame reversal process with respect to the sound signals $Sb_N$, $Sc_N$, $Sd_N$, $Se_N$, and $Sf_N$, as objects to be processed.

Upon completion of the intra-frame reversal process, the CPU 22 multiplies the results of the intra-frame reversal process, i.e., sound signals $Sa_R$, $Sb_R$, $Sc_R$, $Sd_R$, $Se_R$, and $Sf_R$, by a window function ω, as shown in FIG. 12(D) (S130). This window function ω is provided for waveform shaping to smoothly achieve the connection or coupling between the adjacent divided frames $F_i$.

Next, the CPU 22 performs a inter-frame sorting process with respect to sound signals $Sa_W$, $Sb_W$, $Sc_W$, $Sd_W$, $Se_W$, and $Sf_W$, as objects to be processed, obtained by multiplying the sound signals $Sa_R$, $Sb_R$, $Sc_R$, $Sd_R$, $Se_R$, and $Sf_R$ by the window function ω, as shown in FIG. 12(E) (S140). The inter-frame sorting process is a process of generating sound signals $Sa_S$, $Sb_S$, $Sc_S$, $Sd_S$, $Se_S$, and $Sf_S$ obtained by randomly sorting the arrangement of the frames $F_i$ (i=1~15) of each of the sound signals $Sa_W$, $Sb_W$, $Sc_W$, $Sd_W$, $Se_W$, and $Sf_W$.

Hereinafter, the concrete steps of an example of the inter-frame sorting process with respect to the sound signal $Sa_W$, as an object to be processed, will be described. In a case where the number N of frames obtained by dividing the sound signal $Sa_W$ is 15, the CPU 22 generates a random number sequence consisting of numbers ranging from 1 to 15. The CPU 22 reads the 15 random numbers from the first in order. When the first random number is 8, the CPU 22 takes the first frame before sorting as the eighth frame after sorting, and, when the second random number is 4, the CPU 22 takes the second frame before sorting as the fourth frame after sorting . . . . In this way, the CPU 22 decides the order of the frames after sorting depending on the random number sequence. A sound signal obtained by sorting the first to fifteenth frames is taken as a sound signal $Sa_S$. In this embodiment, a plurality of kinds of random number sequences having different random number arrangements (in a case where N=15, all of the random number sequences consist of 15 random numbers) are prepared so as to change the sorting manner. Whenever the inter-frame sorting process is performed, the kind of the random number sequence used in the sorting process is changed.

In the same manner, the CPU 22 performs the inter-frame sorting process with respect to the sound signals $Sb_W$, $Sc_W$, $Sd_W$, $Se_W$, and $Sf_W$, as objects to be processed.

Upon completion of the inter-frame sorting process, the CPU 22 performs a sound effect apply process with respect to each of the sound signals $Sa_S$, $Sb_S$, $Sc_S$, $Sd_S$, $Se_S$, and $Sf_S$, as objects to be processed (S150). In the sound effect apply process, the CPU 22 generates sound signals $Sa_S'$, $Sb_S'$, $Sc_S'$, $Sd_S'$, $Se_S'$, and $Sf_S'$ obtained by applying a predetermined sound effect (for example, reverb) to the sound signals $Sa_S$, $Sb_S$, $Sc_S$, $Sd_S$, $Se_S$, and $Sf_S$ generated as the result of the inter-frame sorting process. Upon completion of the sound effect apply process, the CPU 22 performs a mixing process (S160). In the mixing process, the CPU 22 mixes the sound signals $Sa_S'$, $Sb_S'$, $Sc_S'$, $Sd_S'$, $Se_S'$, and $Sf_S'$, with respect to which the sound effect apply process has been performed, at a predetermined mixing ratio (for example, 1:1:1:1:1:1) and takes the mixed signal as a masker sound signal M. Upon completion of the mixing process, the CPU 22 performs a speech speed converting process (S170). In the speech speed converting process, the CPU 22 extends the time axis of the masker sound signal M, generated by the mixing process, per time length T1 and takes the masker sound signal M, the time axis of which has been extended per time length T1, as an actual masker sound signal M per time length T1' (T1'>T1). More specifically, in this speech speed converting process, the CPU 22 duplicates the frames F, of a normal sound waveform portion excluding a rising sound waveform portion and a falling sound waveform portion, among the frames F, (i=1~15) of the masker signal sound M, as an object to be processed, as much as number necessary to compensate for a time difference between the time length T1 and the time length T1' and inserts duplicated frames $F_i'$ between the frames $F_i$ and $F_{i+1}$ of the normal sound waveform portion.

The CPU 22 outputs the masker sound signal M, with respect to which the speech speed converting process has been performed, and overwrites the output masker sound signal M in a buffer 13 (S180) for actual use. When a detection signal $S_{OUT}$ indicating that the speaker has left the region A is not received from the presence sensor 30 (S190: No) and a time length T2 (T2=1 minute) lapses after Step S140 (S200: Yes), the CPU 22 returns to Step S140 and repeats subsequent processes. Upon receipt of the detection signal $S_{OUT}$ from the presence sensor 30 (S190: Yes), on the other hand, the CPU 22 instructs to a sounding controller 14 to stop reading the masker sound signal M such that the process is ended.

The sixth embodiment as described above has the following effects.

First, in this embodiment, a masker sound signal M is generated from six kinds of sound signals Sa, Sb, Sc, Sd, Se, and Sf. Consequently, it is possible to achieve a high masking effect in the region B even in a case where a plurality of speakers exhibiting different voice properties is present in the region A.

Second, in this embodiment, the normalization process is performed with respect to the sound signals Sa, Sb, Sc, Sd, Se, and Sf, the intra-frame reversal process of reversing sample data in the frames $F_i$ of some of the sound signals $Sa_N$, $Sb_N$, $Sc_N$, $Sd_N$, $Se_N$, and $Sf_N$ obtained through the normalization process and the inter-frame sorting process of sorting the frames $F_i$ (i=1~15) are performed, and sound signals $Sa_S$, $Sb_S$, $Sc_S$, $Sd_S$, $Se_S$, and $Sf_S$ obtained as the result of the inter-frame sorting process are taken as a masker sound signal M. It is difficult to hear an unnatural accent from the sound signals $Sa_S$, $Sb_S$, $Sc_S$, $Sd_S$, $Se_S$, and $Sf_S$ obtained by performing the intra-frame reversal process and the inter-frame sorting process with respect to the sound signals $Sa_N$, $Sb_N$, $Sc_N$, $Sd_N$, $Se_N$, and $Sf_N$ obtained through the normalization process as compared with resultant sound signals obtained by performing both the processes with respect to sound signals to which the normalization process is not performed. Consequently, it is possible to prevent people present in the region B from feeling a sense of incongruity by discharging such a masker sound signal M into the region B, and therefore, it is possible to achieve a high masking effect.

Third, in this embodiment, the sound signals $Sa_S$, $Sb_S$, $Sc_S$, $Sd_S$, $Se_S$, and $Sf_S$ are mixed to obtain a masker sound signal M, and then the masker sound signal M, the time axis of which has been extended, is discharged into the region B. In a case where an arrangement changing process (Step S120 and Step S140) is performed with respect to a sound signal indicating the voice of a person, the processed sound signal generally exhibits voice properties similar to the voice of a person who speaks with a fast rate of speech. According to this embodiment, however, it is possible to alleviate an impression that the voice of such a person who speaks with a fast rate of speech is heard. Also, according to this embodiment, it is not necessary to carefully select sound signals in which it is difficult to exhibit an impression of rapid utterance and to store such sound signals in the sound database 21 in a case where the arrangement is changed.

Fourth, in this embodiment, six kinds of sound signals $Sa_S'$, $Sb_S'$, $Sc_S'$, $Sd_S'$, $Se_S'$, and $Sf_S'$ are mixed, and a sound effect is applied to the mixed sound signal. A masker sound signal M obtained by applying the sound effect to the mixed sound signal is acoustically similar to a voice (a target sound T) to which a spatial sound effect (reverb) is applied through the transmission of the voice to the region B. Consequently, it is possible to prevent a person who is present in a region into which a masker sound is discharged from feeling a sense of incongruity, thereby achieving a high masking effect in such a region.

Fifth, in this embodiment, sample data in half the total number of the frames $F_i$ of the sound signals $Sa_N$, $Sb_N$, $Sc_N$, $Sd_N$, $Se_N$, and $Sf_N$ are reversed to generate a masker sound signal M. Consequently, it is possible to achieve a higher masking effect than in a case where sample data in more than half the total number of the frames $F_i$ are reversed to generate a masker sound signal M and in a case where sample data in less than half the total number of the frames $F_i$ are reversed to generate a masker sound signal M. Here, the inventors of the present application have found that it is possible to achieve the highest masking effect in a case where a ratio of the number of the frames $F_i$ in which the sample data are reversed to the number of the frames $F_i$ in which the sample data are not reversed is approximately 1:1 as the result of comparison between masking effects of masking sound signals M obtained by variously changing the number Num of the frames $F_i$ subject to reversal of the sample data.

Seventh Embodiment

Figure 14:
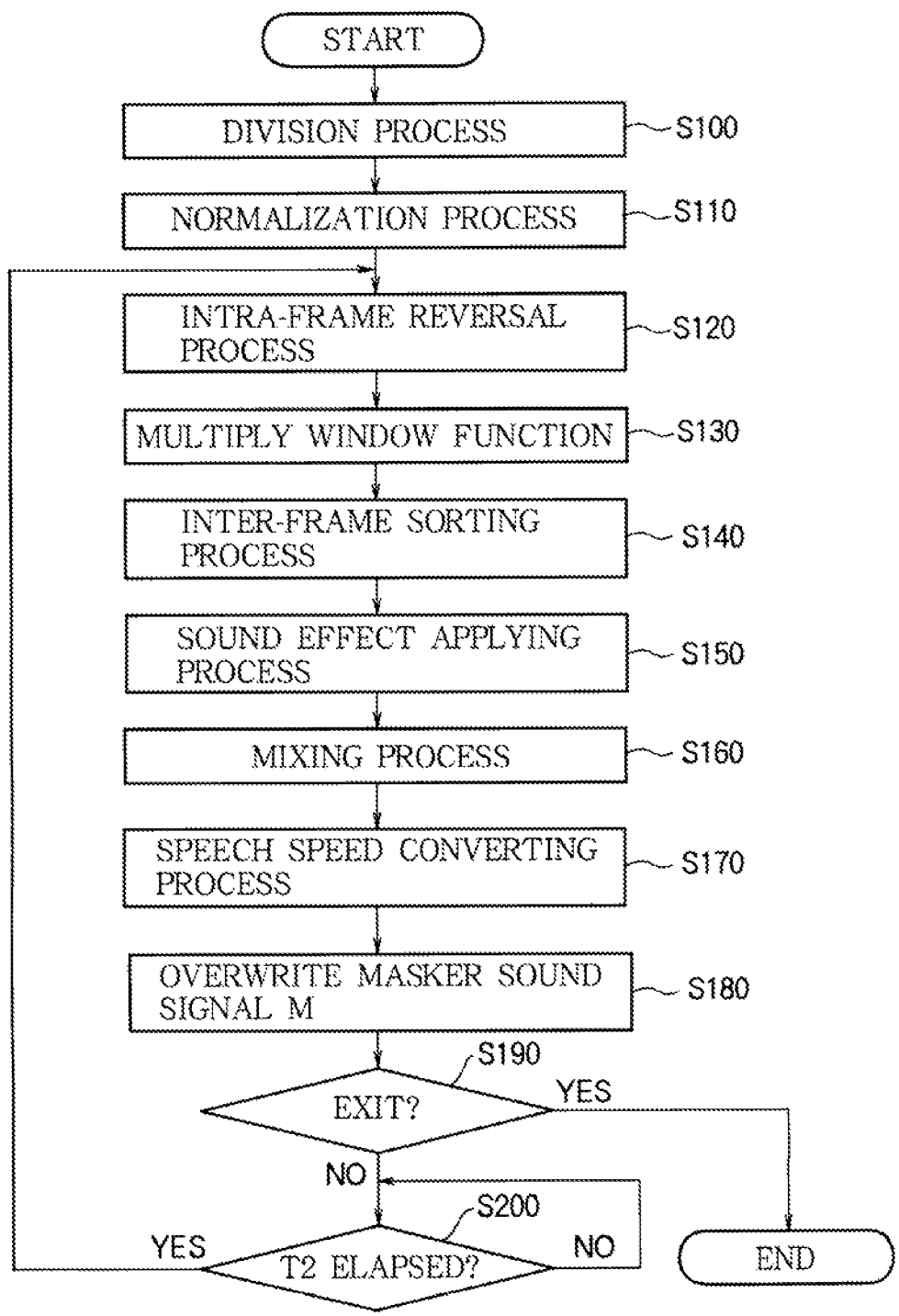
FIG. 14 is a flow chart illustrating the operation of the masker sound generation apparatus according to the seventh embodiment of the present invention.

Next, a seventh embodiment of the present invention will be described. In a generation process of this embodiment, a CPU 22 repeats loop processes of Step S120 to Step S200 per time length T2 with respect to sound signals $Sa_N$, $Sb_N$, $Sc_N$, $Sd_N$, $Se_N$, and $Sf_N$, as objects to be processed, obtained through a normalization process of Step S110, as shown in FIG. 14. That is, the CPU 22 overwrites a masker sound signal M in a buffer 13 at Step S180. Subsequently, when a detection signal $S_{OUT}$ indicating that a speaker has left a region A is not received from a presence sensor 30 (S190: No) and a time length T2 lapses (S200: Yes), the CPU 22 returns to Step S120. At Step S120, the CPU 22 randomly reselects some of the frames $F_i$ (i=1, 2 . . . ) of each of the sound signals $Sa_N$, $Sb_N$, $Sc_N$, $Sd_N$, $Se_N$, and $Sf_N$, generates sound signals $Sa_R$, $Sb_R$, $Sc_R$, $Sd_R$, $Se_R$, and $Sf_R$ obtained by reversing sample data in the reselected frames $F_i$, and performs subsequent processes with respect to the latest sound signals $Sa_R$, $Sb_R$, $Sc_R$, $Sd_R$, $Se_R$, and $Sf_R$, as objects to be processed.

According to this embodiment, the sound signals $Sa_R$, $Sb_R$, $Sc_R$, $Sd_R$, $Se_R$, and $Sf_R$ obtained by reversing the sample data in the frames $F_i$, located at different positions, of the sound signals $Sa_N$, $Sb_N$, $Sc_N$, $Sd_N$, $Se_N$, and $Sf_N$, are generated per time length T2. According to this embodiment, therefore, it is possible to more effectively prevent a person who is present in the region B from feeling a sense of incongruity.

Although the sixth and seventh embodiments of the present invention were described as stated above, other embodiments may be provided, for example, as follows.

(1) In the sixth embodiment as described above, Step S140 to Step S200 may be repeated during particular different time periods $T2_a$, $T2_b$, $T2_c$, $T2_d$, $T2_e$, and $T2_f$ with respect to a plurality of kinds of sound signals $Sa_W$, $Sb_W$, $Sc_W$, $Sd_W$, $Se_W$, and $Sf_W$, as objects to be processed, respectively. Also, in the seventh embodiment, Step S120 to Step S200 may be repeated during particular different time periods $T2_a$, $T2_b$, $T2_c$, $T2_d$, $T2_e$, and $T2_f$ with respect to a plurality of kinds of sound signals $Sa_N$, $Sb_N$, $Sc_N$, $Sd_N$, $Se_N$, and $Sf_N$, as objects to be processed, respectively. In this case, the particular different time periods $T2_a$, $T2_b$, $T2_c$, $T2_d$, $T2_e$, and $T2_f$ may have disjointed lengths (lengths having a ratio of relatively prime numbers such as 1:3:5). As a result, it is difficult for a person present in the region B to perceive periodicity of accent occurring when a masker sound signal M is continuously discharged into the region B for a long period of time. Consequently, it is possible to more effectively prevent the person who is present in the region B from feeling a sense of incongruity.

(2) In the generation process of the sixth and seventh embodiments as described above, the intra-frame reversal process and the inter-frame sorting process may be repeated during different time periods. In the generation process of this embodiment, the CPU 22 performs the following process. Upon receipt of a detection signal $S_{IN}$ from the presence sensor 30, the CPU 22 performs the processes of Step S100 to Step S180 shown in FIGS. 11 and 14 and overwrites a masker sound signal M obtained through the process of Step S180 in the buffer 13. Afterwards, the CPU 22 launches and executes two process tasks task-1 and task-2 shown in FIG. 15.

In the process task task-1, the CPU 22 repeats the intra-frame reversal process per time length T4 with respect to the masker sound signal M, as an object to be processed, written in the buffer 13. In the intra-frame reversal process of the task-1, the CPU 22 divides the masker sound signal M written in the buffer 13 into frames $F_i$ (i=1, 2 . . . ), randomly selects some of the divided frames $F_i$ (i=1, 2 . . . ), and overwrites a masker sound signal M obtained by reversing samples in the selected frames $F_i$ in the buffer 13. Also, in the process task task-2, the CPU 22 repeats the inter-frame sort process per time length T5 (T5≠T4) with respect to the masker sound signal M, as an object to be processed, written in the buffer 13. In the inter-frame sort process of the task-2, the CPU 22 divides the masker sound signal M written in the buffer 13 into frames $F_i$ (i=1, 2 . . . ) and overwrites a masker sound signal M obtained by randomly sorting the divided frames $F_i$ (i=1, 2 . . . ) in the buffer 13. In this case, the time length T4 and the time length T5 may have disjointed lengths. As a result, it is difficult for a person present in the region B to perceive periodicity of accent occurring when a masker sound signal M is continuously discharged into the region B for a long period of time. Consequently, it is possible to more effectively prevent the person who is present in the region B from feeling a sense of incongruity.

(3) In the sixth and seventh embodiments as described above, upon receipt of a detection signal $S_{IN}$ from the presence sensor 30, the CPU 22 may perform Step S100 to Step S180 only once and discharge the masker sound signal M written in the buffer 13 at Step S180 into the region B until a detection signal $S_{OUT}$ from the presence sensor 30 is received.

(4) In the sixth and seventh embodiments as described above, the CPU 22 may perform the intra-frame reversal process (S120) and then output a sound signal obtained by mixing sound signals $Sa_R$, $Sb_R$, $Sc_R$, $Sd_R$, $Se_R$, and $Sf_R$ obtained through the intra-frame reversal process as a masker sound signal M.

(5) In the acquisition process of the sixth and seventh embodiments as described above, six kinds of sound signals Sa, Sb, Sc, Sd, Se, and Sf were acquired, and in the generation process of the sixth and seventh embodiments, a masker sound signal M was generated from these six kinds of sound signals Sa, Sb, Sc, Sd, Se, and Sf. However, in the acquisition process, five or less kinds of sound signals S, including one kind of sound signal, or seven or more kinds of sound signals S may be acquired, and, in the generation process, a masker sound signal M may be generated from one or more kinds of sound signals.

(6) In the sixth and seventh embodiments as described above, a microphone may be installed in the region A. In this case, the CPU 22 may acquire a sound signal recorded through the microphone in the region A in the acquisition process and may generate a masker sound signal M from the acquired sound signal in the generation process.

(7) In the sixth and seventh embodiments as described above, the processes of Step S120 and Step S130 may be performed in reverse order such that the frames $F_i$ of each of the sound signals Sa, Sb, Sc, Sd, Se, and Sf are multiplied by a window function ω and then the arrangement of samples in each of the frames $F_i$ is reversed.

(8) In the sixth and seventh embodiments as described above, whenever the presence sensor 30 detects that a speaker had entered the region A, sound signals $Sa_S$, $Sb_S$, $Sc_S$, $Sd_S$, $Se_S$, and $Sf_S$ were read from the sound database 21, the respective processes of Step S100 to Step S190 were performed with respect to the sound signals $Sa_S$, $Sb_S$, $Sc_S$, $Sd_S$, $Se_S$, and $Sf_S$, as objects to be processed, to obtain a masker sound signal M, and the masker sound signal M was discharged into the region B. However, the masker sound signal M obtained by performing the respective processes of Step S100 to Step S190 may be stored in a memory, and, whenever the presence sensor 30 detects that a speaker has entered the region A, the masker sound signal M may be read from the memory and repeatedly discharged into the region B. In this case, a series of processes of FIG. 11 or 14 may be repeated a plurality of times with respect to the sound signals $Sa_S$, $Sb_S$, $Sc_S$, $Sd_S$, $Se_S$, and $Sf_S$ having a length of time length T1 (T1=30 seconds) to generate a masker sound signal M per time length T6 (for example, T6=10 minutes), which is much longer than the time length T1, and the masker sound signal M per time length T6 may be stored in the memory for future use.

(9) In the sixth and seventh embodiments as described above, the present invention was applied to prevent voice leakage from the region A to the region B divided from the region A by the partition 50 such that the region B is located outside the region A. However, in a case where two regions A' and B' between which the partition 50 is not disposed are provided, the present invention may be applied to effectively prevent sound generated in one region A' (or B') from being transmitted to the other region B' (or A'). Also, the masker sound generation apparatus 10 may be installed in a room separated from the outside by four walls and a ceiling, and a masker sound signal M generated by the masker sound generation apparatus 10 may be discharged to a region outside the walls. Also, in communication devices (for example, mobile phones, IP phones, interphones, etc.) which enable speakers present in different spaces to communicate with each other, the present invention may be applied to effectively prevent voices of the respective speakers from being transmitted to the surroundings. This embodiment may be achieved, for example, by installing the masker sound generation apparatus 10 according to the sixth and seventh embodiments in a communication device such that a masker sound signal M generated by the masker sound generation apparatus 10 is discharged around a speaker. In this case, the speaker may wear an earphone or the directivity of a speaker unit of the communication device may be controlled to prevent the masker sound signal M from being transmitted to the opposite party of communication, thereby preventing conversation muddling.

(10) In the sixth and seventh embodiments as described above, the hard disk 11 may be an external component of the masker sound generation apparatus 10. In this embodiment, sound signals Sa, Sb, Sc, Sd, Se, and Sf may be acquired from the sound database 21 in an external memory device via a network, and a masker sound signal M may be generated using the sound signals Sa, Sb, Sc, Sd, Se, and Sf. Also, the buffer 13, the sounding controller 14, the D/A converter 15, and/or the amplifier 16 may be external components of the masker sound generation apparatus 10. In this embodiment, for example, the masker sound signal M generated using the sound signals Sa, Sb, Sc, Sd, Se, and Sf may be output to the external memory device serving as the buffer 13 through various kinds of interfaces.

(11) In the inter-frame sorting process of the sixth and seventh embodiments as described above, the random number sequence consisting of different numbers ranging from 1 to N was used to sort the frames. However, a random number sequence in which identical random numbers appear a plurality of times may be used to sort the frames. Also, when the first random number is 8, the eighth frame before sorting may be taken as the first frame after sorting, and, when the second random number is 4, the fourth frame before sorting may be taken as the second frame after sorting . . . . In this way, a frame to be selected may be decided among the frames before sorting depending on the random number sequence.

Eighth Embodiment

Figure 16:
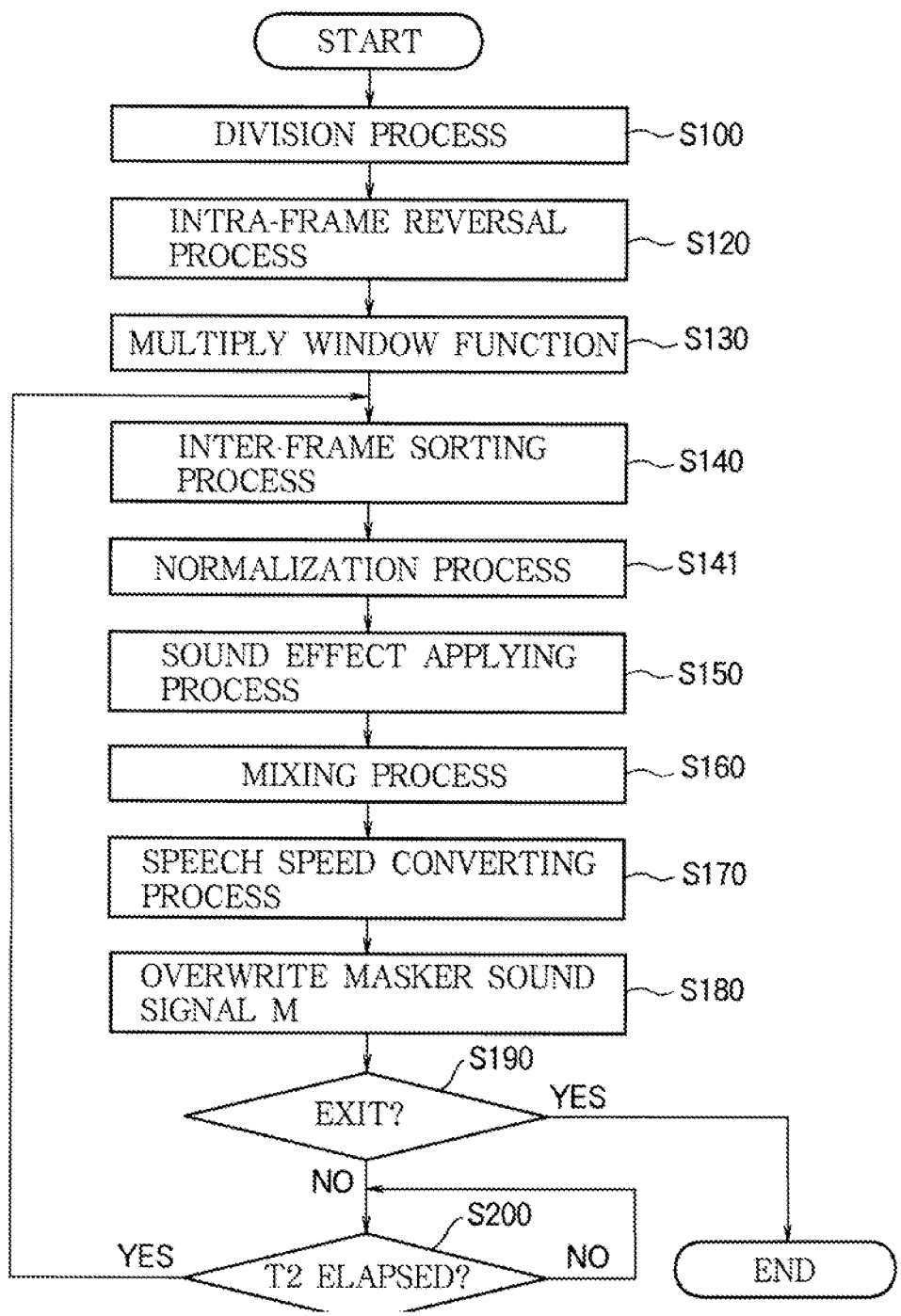
FIG. 16 is a flow chart illustrating the operation of the masker sound generation apparatus according to the eighth embodiment of the present invention.

Next, an eighth embodiment of the present invention will be described. In a generation process of this embodiment, a CPU 22 does not perform a normalization process before a inter-frame sorting process, as shown in FIG. 16, unlike the previous sixth embodiment. Instead, the CPU 22 performs the inter-frame sorting process and then performs the normalization process (S141) with respect to sound signals $Sa_S$, $Sb_S$, $Sc_S$, $Sd_S$, $Se_S$, and $Sf_S$, as objects to be processed, obtained through the inter-frame sorting process.

Even in this embodiment, it is possible to prevent a person who is present in the region B from feeling a sense of incongruity, thereby achieving a high masking effect.

The sixth and eighth embodiments as described above have the following effects.

First, in this embodiment, a masker sound signal M is generated from six kinds of sound signals Sa, Sb, Sc, Sd, Se, and Sf. Consequently, it is possible to achieve a high masking effect in the region B even in a case where a plurality of speakers exhibiting different voice properties is present in the region A.

Second, in this embodiment, the normalization process is performed with respect to the sound signals Sa, Sb, Sc, Sd, Se, and Sf, the intra-frame reversal process of reversing sample data in the frames $F_i$ of some of the sound signals $Sa_N$, $Sb_N$, $Sc_N$, $Sd_N$, $Se_N$, and $Sf_N$ obtained through the normalization process and the inter-frame sorting process of sorting the frames $F_i$ (i=1~15) are performed, and sound signals $Sa_S$, $Sb_S$, $Sc_S$, $Sd_S$, $Se_S$, and $Sf_S$ obtained as the result of the inter-frame sorting process are taken as a masker sound signal M. It is difficult to hear an unnatural accent from the sound signals $Sa_S$, $Sb_S$, $Sc_S$, $Sd_S$, $Se_S$, and $Sf_S$ obtained by performing the intra-frame reversal process and the inter-frame sorting process with respect to the sound signals $Sa_N$, $Sb_N$, $Sc_N$, $Sd_N$, $Se_N$, and $Sf_N$ obtained through the normalization process as compared with resultant sound signals obtained by performing both the processes with respect to sound signals with respect to which the normalization process is not performed. Consequently, it is possible to prevent people present in the region B from feeling a sense of incongruity by discharging such a masker sound signal M into the region B, and therefore, it is possible to achieve a high masking effect.

Although the sixth and eighth embodiments of the present invention were described as stated above, other embodiments may be provided, for example, as follows.

(1) In the normalization process of the sixth and eighth embodiments as described above, the CPU 22 determined the reference value $LAVE_{REF}$ of the average sound volume levels $LAVE_i$ (i=1~15) of the frames $F_i$ (i=1~15) of the sound signals Sa, Sb, Sc, Sd, Se, and Sf, then obtained the correction coefficients $M_{AVE}$ necessary to equalize the average sound volume levels $LAVE_i$ (i=1~15) of the frames $F_i$ (i=1~15) with the reference value $LAVE_{REF}$, and corrected sample data in the frames $F_i$ using the correction coefficients $M_{AVE}$ obtained with respect to the respective frames $F_i$. However, the CPU 22 may decide correction coefficients MA necessary to limit differences between the average sound volume levels $LAVE_i$ (i=1~15) of the frames $F_i$ (i=1~15) and the reference value $LAVE_{REF}$ within a predetermined range (for example, α) and correct sample data in the frames $F_i$ using the correction coefficients MA obtained with respect to the respective frames $F_i$.

Hereinafter, the concrete steps of an example of the normalization process with respect to the sound signal Sa, as an object to be processed, will be described. First, the CPU 22 performs a first correction process with respect to the sound signal Sa. The contents of the first correction process are identical to those of the sixth and eighth embodiments. Subsequently, the CPU 22 performs a second correction process as follows.

The CPU 22 obtains an average sound volume level $LAVE_i$ of a sound waveform having a time length T1/15 represented by sample data in each of the frames $F_i$ (i=1~15) of the sound signal Sa, which has been multiplied by the peak level correction coefficient $M_{PAEK}$ through the first correction process.

Figure 17A:
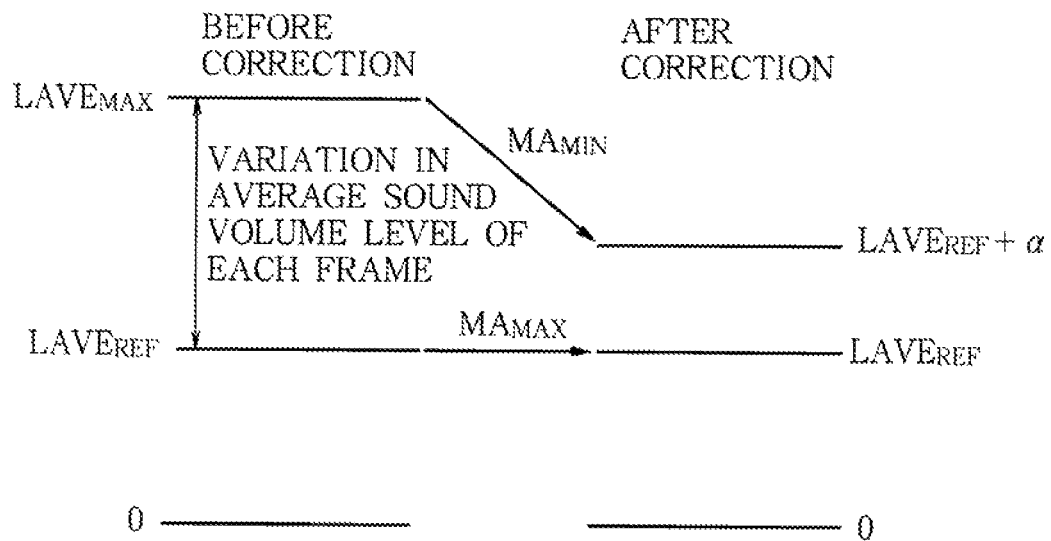
FIG. 17 is a view illustrating a sound signal process performed by a masker sound generation apparatus according to another embodiment of the present invention.

Next, the CPU 22 obtains the minimum value $LAVE_{MIN}$ and the maximum value $LAVE_{MAX}$ of the average sound volume levels $LAVE_i$ (i=1~15), and takes the minimum value $LAVE_{MIN}$ as a reference value $LAVE_{REF}$. Also, as shown in FIG. 17(A), the CPU 22 decides a correction coefficient MA ($MA_{MAX} \geq MA \geq MA_{MIN}$) necessary to map each of the average sound volume levels $LAVE_i$ (i=1~15) of the frames $F_i$ (i=1~15) distributed in a range defined between the reference value $LAVE_{REF}$ and the maximum value $LAVE_{MAX}$ in a range defined between the reference value $LAVE_{REF}$ and the sound volume level $LAVE_{REF}$+α, and multiplies the sample data in each of the frames $F_i$ by the correction coefficient MA decided for each of the frames $F_i$.

Figure 17B:
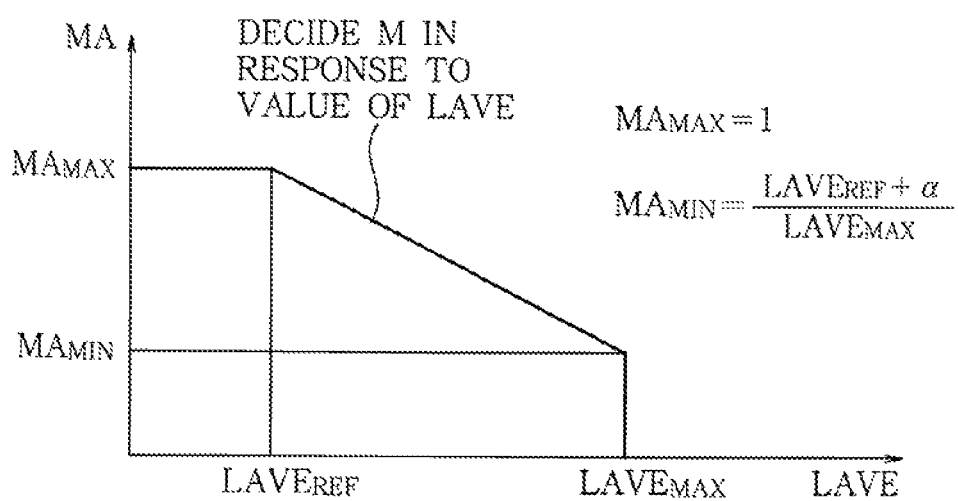

Here, the correction coefficient MA for each of the frames $F_i$ may be decided, for example, as follows. First, as shown in FIG. 17(B), the correction coefficient $MA_{MAX}$ of each of the frames $F_i$ (i=1~15) having the average sound volume level $LAVE_i$ as the reference value $LAVE_{REF}$ is taken as 1, and the correction coefficient $MA_{MIN}$ of each of the frames $F_i$ (i=1~15) having the largest difference between the average sound volume level $LAVE_i$ and the reference value $LAVE_{REF}$ (having the average sound volume level $LAVE_i$ as the maximum value $LAVE_{MAX}$) is taken as ($LAVE_{REF}$+α)/$LAVE_{MAX}$. Also, the correction coefficient MA applied to the average sound volume level $LAVE_i$ between the reference value $LAVE_{REF}$ and the maximum value $LAVE_{MAX}$ is taken as a value which is distant from the correction coefficient $MA_{MAX}$ and close to the correction coefficient $MA_{MIN}$ in proportion to a difference between the average sound volume level $LAVE_i$ of each of the frames $F_i$ and the reference value $LAVE_{REF}$.

In the sixth and eighth embodiments as described above, the correction process is performed such that the average sound volume levels $LAVE_i$ (i=1~15) of all of the frames $F_i$ (i=1~15) coincide with the reference value $LAVE_{REF}$ with the result that the sound volume of a masker sound signal M may be perceived as flat, and therefore, on the contrary, the masker sound signal M may be unnatural. In order to solve such a problem, it is possible to provide fluctuation to the extent that differences between the average sound volume levels $LAVE_i$ (i=1~15) of the frames $F_i$ (i=1~15) and the reference value $LAVE_{REF}$ are limited within a predetermined range (for example, α), thereby alleviating the flat sensation and thus generating a masker sound signal M having limited unnatural sound.

(2) In the normalization process of the sixth and eighth embodiments as described above, the CPU 22 took the minimum value of each of the average sound volume levels $LAVE_i$ (i=1~15) of the respective frames $F_i$ (i=1~15) of the sound signal Sa as the reference value $LAVE_{REF}$. However, the maximum value, the average value, or the intermediate value of each of the average sound volume levels $LAVE_i$ (i=1~15) may be taken as the reference value $LAVE_{REF}$ or representative value.

(3) In the sixth embodiment as described above, the normalization process may be performed with respect to the sound signals $Sa_W$, $Sb_W$, $Sc_W$, $Sd_W$, $Se_W$, and $Sf_W$, as objects to be processed, obtained through multiplication using the window function ω at Step S130. Also, in the eighth embodiment, the normalization process may be performed with respect to the sound signals $Sa_S'$, $Sb_S'$, $Sc_S'$, $Sd_S'$, $Se_S'$, and $Sf_S'$, as objects to be processed, obtained as the result of the sound effect applying process (S150). Also, the normalization process may be performed with respect to the masker sound signal M, as an object to be processed, obtained through the mixing process (S160).

(5) In the acquisition process of the sixth and eighth embodiments as described above, six kinds of sound signals Sa, Sb, Sc, Sd, Se, and Sf were acquired, and in the generation process of the sixth and eighth embodiments, a masker sound signal M was generated from these six kinds of sound signals Sa, Sb, Sc, Sd, Se, and Sf. However, in the acquisition process, five or less kinds of sound signals S, including one kind of sound signal, or seven or more kinds of sound signals S may be acquired, and, in the generation process, a masker sound signal M may be generated from one or more kinds of sound signals.

(6) In the sixth and eighth embodiments as described above, a microphone may be installed in the region A. In this case, the CPU 22 may acquire a sound signal recorded through the microphone in the region A in the acquisition process and may generate a masker sound signal M from the acquired sound signal in the generation process.

(7) In the sixth and eighth embodiments as described above, the processes of Step S120 and Step S130 may be performed in reverse order such that the frames $F_i$ of each of the sound signals Sa, Sb, Sc, Sd, Se, and Sf are multiplied by a window function ω, and then the arrangement of sample data in each of the frames $F_i$ is reversed.

(8) In the sixth and eighth embodiments as described above, whenever the presence sensor 30 detects that a speaker had entered the region A, sound signals $Sa_S$, $Sb_S$, $Sc_S$, $Sd_S$, $Se_S$, and $Sf_S$ were read from the sound database 21, the respective processes of Step S100 to Step S190 were performed with respect to the sound signals $Sa_S$, $Sb_S$, $Sc_S$, $Sd_S$, $Se_S$, and $Sf_S$, as objects to be processed, to obtain a masker sound signal M, and the masker sound signal M was discharged into the region B. However, the masker sound signal M obtained by performing the respective processes of Step S100 to Step S190 may be stored in a memory, and, whenever the presence sensor 30 detects that a speaker has entered the region A, the masker sound signal M may be read from the memory and repeatedly discharged into the region B. In this case, a series of processes of FIG. 11 or 16 may be repeated a plurality of times with respect to the sound signals $Sa_S$, $Sb_S$, $Sc_S$, $Sd_S$, $Se_S$, and $Sf_S$ having a length of time length T1 (T1=30 seconds) to generate a masker sound signal M per time length T6 (for example, T6=10 minutes), which is much longer than the time length T1, and the masker sound signal M per time length T6 may be stored in the memory for future use.

(9) In the sixth and eighth embodiments as described above, the present invention was applied to prevent voice leakage from the region A to the region B divided from the region A by the partition 50 such that the region B is located outside the region A. However, in a case where two regions A' and B' between which the partition 50 is not disposed are provided, the present invention may be applied to effectively prevent sound generated in one region A' (or B') from being transmitted to the other region B' (or A'). Also, the masker sound generation apparatus 10 may be installed in a room separated from the outside by four walls and a ceiling, and a masker sound signal M generated by the masker sound generation apparatus 10 may be discharged to a region outside the walls. Also, in communication devices (for example, mobile phones, IP phones, interphones, etc.) which enable speakers present in different spaces to communicate with each other, the present invention may be applied to effectively prevent voices of the respective speakers from being transmitted to the surroundings. This embodiment may be achieved, for example, by installing the masker sound generation apparatus 10 according to the sixth and eighth embodiments in a communication device such that a masker sound signal M generated by the masker sound generation apparatus 10 is discharged around a speaker. In this case, the speaker may wear an earphone or the directivity of a speaker unit of the communication device may be controlled to prevent the masker sound signal M from being transmitted to the opposite party of communication, thereby preventing conversation muddling.

(10) In the sixth and eighth embodiments as described above, the intra-frame reversal process (S120) was performed with respect to the sound signals $Sa_N$, $Sb_N$, $Sc_N$, $Sd_N$, $Se_N$, and $Sf_N$, as objects to be processed, in the same sequence. However, the number Num of the frames $F_i$ in which the sample data have been reversed or the positions of the frames $F_i$ in which the sample data have been reversed may be changed for each of the sound signals $Sa_N$, $Sb_N$, $Sc_N$, $Sd_N$, $Se_N$, and $Sf_N$. According to this embodiment, it is possible to achieve a higher masking effect than a masker sound signal M obtained by equalizing the number Num of the frames $F_i$ in which the sample data have been reversed or the positions of the frames $F_i$ in which the sample data have been reversed with respect to all of the sound signals $Sa_N$, $Sb_N$, $Sc_N$, $Sd_N$, $Se_N$, and $Sf_N$.

(11) In the sixth and eighth embodiments as described above, the CPU 22 divided the sound signals Sa, Sb, Sc, Sd, Se, and Sf into frames $F_i$ (i=1~15), each having a time length T3 (T3=100 milliseconds), as shown in FIG. 12(A). However, the sound signals Sa, Sb, Sc, Sd, Se, and Sf may be divided into frames $F_i$ (i=1~15) having overlap sections between neighboring frames. This embodiment may be achieved as follows. First, as shown in FIG. 18, the CPU 22 divides sound signals Sa, Sb, Sc, Sd, Se, and Sf (In FIG. 18, only the process of the sound signal Sa is shown for simplicity.), each having a length of time length T1, into frames $F_i$ (i=1~15) of a time length T3+2t having an overlap section corresponding to a time length t (t<T3) before and after an intermediate section (S101). The CPU 22 performs the normalization process (S110), the intra-frame reversal process (S120), and the window function multiplication process (S130) with respect to each of the frames $F_i$ (i=1~15) having the time length T3+2t. Next, the CPU 22 overlaps the frames $F_i$ (i=1~15) which have been multiplied by the window function such that crossfading is achieved between neighboring frames (S131) to generate sound signals $Sb_W$, $Sc_W$, $Sd_W$, $Se_W$, and $Sf_W$ having the same time length T1 as the original sound signals Sa, Sb, Sc, Sd, Se, and Sf. Also, the CPU 22 divides the sound signals $Sb_W$, $Sc_W$, $Sd_W$, $Se_W$, and $Sf_W$ into frames $F_i$ (i=1~15) having a time length T3 (S132), and performs the inter-frame sorting process (S140) with respect to the divided frames $F_i$ (i=1~15), as objects to be processed. According to this embodiment, it is possible to generate a masker sound signal M having more smooth sound quality, thereby providing less of a sense of incongruity.

(12) In the sixth and eighth embodiments as described above, the hard disk 11 may be an external component of the masker sound generation apparatus 10. In this embodiment, sound signals Sa, Sb, Sc, Sd, Se, and Sf may be acquired from the sound database 21 in an external memory device via a network, and a masker sound signal M may be generated using the sound signals Sa, Sb, Sc, Sd, Se, and Sf. Also, the buffer 13, the sounding controller 14, the D/A converter 15, and/or the amplifier 16 may be external components of the masker sound generation apparatus 10. In this embodiment, for example, the masker sound signal M generated using the sound signals Sa, Sb, Sc, Sd, Se, and Sf may be output to the external memory device serving as the buffer 13 through various kinds of interfaces.

(13) In the inter-frame sorting process of the embodiments as described above, the random number sequence consisting of different numbers ranging from 1 to N was used to sort the frames. However, a random number sequence in which identical random numbers appear a plurality of times may be used to sort the frames. Also, when the first random number is 8, the eighth frame before sorting may be taken as the first frame after sorting, and, when the second random number is 4, the fourth frame before sorting may be taken as the second frame after sorting . . . . In this way, a frame to be selected may be decided among the frames before sorting depending on the random number sequence.

(14) In the embodiments as described above, the sound signals Sa, Sb, Sc, Sd, Se, and Sf having the time length T1, acquired through the acquisition process, were divided into frames $F_i$ (i=1~N) having a time length T3, and the normalization process was performed with respect to each of the frames $F_i$ (i=1~N) having the time length T3, as objects to be processed, such that fluctuation in time domain of sound volume of the respective frames $F_i$ was limited within a predetermined range. However, a process of limiting temporal fluctuation of sound volume in the time length T1 within a predetermined range may be performed with respect to the sound signals Sa, Sb, Sc, Sd, Se, and Sf having the time length T1 without dividing the sound signals Sa, Sb, Sc, Sd, Se, and Sf having the time length T1.

The invention claimed is:

1. A masker sound generation apparatus comprising:
an acquisition part that acquires a sound signal having a first predetermined time length; and
a generation part that repeats, for a second predetermined time length longer than the first predetermined time length, a process of outputting a masker sound signal obtained by changing a sequence of arrangement of the sound signal of the first predetermined time length according to a random number sequence, and that repeats a process of altering the random number sequence each time the second predetermined time length passes.

2. The masker sound generation apparatus according to claim 1, wherein the generation part divides the sound signal acquired by the acquisition part into a plurality of sections each having a third predetermined time length, then repeats a sorting process of sorting the divided sections as a process of changing the sequence of arrangement of the sound signal, and alters a manner of sorting the sections as the process of altering the manner each time the sorting process is repeated.

3. The masker sound generation apparatus according to claim 1, wherein
the acquisition part acquires a plurality of kinds of sound signals so as to generate one kind of masker sound signal, and
the generation part divides each of the plurality of kinds of the sound signals into a plurality of sections each having a third predetermined time length, then repeats a sorting process of sorting the divided sections as a process of changing the sequence of arrangement of the sound signal, and alters a manner of sorting the sections of each of the plurality of kinds of the sound signals as the process of altering the manner.

4. The masker sound generation apparatus according to claim 2, wherein the generation part performs a reversal process of reversing arrangement of the sound signal within each section obtained by dividing the sound signal, and generates the masker sound signal using signals obtained through the reversal process and the sorting process.

5. A non-transitory computer readable storage medium containing a program executable by a computer to perform:
acquiring a sound signal having a first predetermined time length;
repeating, for a second predetermined time length longer than the first predetermined time length, a process of outputting a masker sound signal obtained by changing a sequence of arrangement in the acquired sound signal of the first predetermined time length according to a random number sequence; and
repeating a process of altering the random number sequence each time the second predetermined time length passes.

6. A masker sound generation apparatus comprising:
an acquisition part that acquires a sound signal having a first predetermined time length; and
a generation part that divides the sound signal acquired by the acquisition part into a plurality of sections each containing sound signal fractions, then repeats, each time a second predetermined time length passes, the second predetermined time length longer than the first predetermined time length, generating sound signal fractions obtained by selecting some of the divided sections according to a random number sequence and by reversing each of the sound signal fractions of the selected sections, and repeating, for the second predetermined time length, sequentially outputting the generated sound signal fractions to form a masker sound signal.

7. The masker sound generation apparatus according to claim 6, wherein the generation part generates sound signal fractions obtained by reversing arrangement of each of the sound signal fractions in the selected sections, and sorts the plurality of sections of the sound signal and sequentially outputs the sorted sections of the sound signal to form the masker sound signal.

8. The masker sound generation apparatus according to claim 7, wherein the generation part repeatedly alters a manner of sorting the plurality of sections of the sound signal each time the second predetermined time length passes.

9. The masker sound generation apparatus according to claim 6, wherein the generation part repeats change of sections in which the arrangements of the sound signal fractions are reversed among the plurality of sections each time the second predetermined time length passes.

10. A non-transitory computer readable storage medium containing program executable by a computer to perform:
acquiring a sound signal having a first predetermined time length;
dividing the acquired sound signal into a plurality of sections each containing sound signal fractions;
repeating, each time a second predetermined time length passes, the second predetermined time length longer than the first predetermined time length, a process of generating sound signal fractions obtained by selectively reversing the sound signal fractions in some of the divided sections according to a random number sequence; and
repeating, for the second predetermined time length, sequentially outputting the generated sound signal fractions to form a masker sound signal.

11. A masker sound generation apparatus comprising:
an acquisition part that acquires a sound signal having a first predetermined time length; and
a generation part that repeats, each time a second predetermined time length passes, altering a random number sequence and generating a masker sound signal obtained by changing a sequence of arrangement of the sound signal of the first predetermined time length according to the random number sequence, wherein the generation part performs a normalization process of limiting fluctuation in time domain of a sound volume of the masker sound signal within a predetermined range during the course of generating the masker sound signal, wherein the second predetermined time length is longer than the first predetermined time length.

12. The masker sound generation apparatus according to claim 11, wherein the generation part divides the sound signal acquired by the acquisition part into a plurality of sections each having a third predetermined time length, and performs a process of limiting an average sound volume of each of the sections within a predetermined range as the normalization process.

13. The masker sound generation apparatus according to claim 12, wherein, during the normalization process, the generation part determines a representative value of the average sound volume among the plurality of sections, then obtains a correction coefficient to equalize the average sound volume of each section with the representative value, and corrects the sound signal of each section using the correction coefficient obtained per section.

14. The masker sound generation apparatus according to claim 12, wherein, during the normalization process, the generation part determines a representative value of the average sound volume among the plurality of sections, then obtains a correction coefficient to limit a difference between the average sound volume of each section and the representative value within a predetermined range, and corrects the sound signal of each section using the correction coefficient obtained per section.

15. A non-transitory computer readable storage medium containing program executable by a computer to perform:

acquiring a sound signal having a first predetermined time length;

generating a masker sound signal obtained by repeating, each time a second predetermined time length passes, altering a random number sequence and changing a sequence of arrangement in the acquired sound signal of the first predetermined time length according to the random number sequence; and carrying out a normalization process of limiting fluctuation in time domain of a sound volume of the masker sound signal within a predetermined range during the course of generating the masker sound signal, wherein the second predetermined time length is longer than the first predetermined time length.

16. The masker sound generation apparatus according to claim 1, further comprising a storage that stores the sound signal, wherein the acquisition part acquires the first predetermined time length of the sound signal from the storage.

17. The masker sound generation apparatus according to claim 6, further comprising a storage that stores the sound signal, wherein the acquisition part acquires the first predetermined time length of the sound signal from the storage.

18. The masker sound generation apparatus according to claim 11, further comprising a storage that stores the sound signal, wherein the acquisition part acquires the first predetermined time length of the sound signal from the storage.

* * * * *